US011863020B2

(12) United States Patent
Nigo et al.

(10) Patent No.: US 11,863,020 B2
(45) Date of Patent: Jan. 2, 2024

(54) MOTOR, COMPRESSOR, AND AIR CONDITIONER

(71) Applicant: Mitsubishi Electric Corporation, Tokyo (JP)

(72) Inventors: Masahiro Nigo, Tokyo (JP); Yuji Hirosawa, Tokyo (JP); Emi Tsukamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 351 days.

(21) Appl. No.: 17/430,818

(22) PCT Filed: Feb. 21, 2019

(86) PCT No.: PCT/JP2019/006563
§ 371 (c)(1),
(2) Date: Aug. 13, 2021

(87) PCT Pub. No.: WO2020/170390
PCT Pub. Date: Aug. 27, 2020

(65) Prior Publication Data
US 2022/0166270 A1    May 26, 2022

(51) Int. Cl.
*H02K 1/27* (2022.01)
*H02K 1/276* (2022.01)
(Continued)

(52) U.S. Cl.
CPC ............ *H02K 1/276* (2013.01); *H02K 1/145* (2013.01); *H02K 1/28* (2013.01); *H02K 7/14* (2013.01)

(58) Field of Classification Search
CPC .......... H02K 1/145; H02K 1/276; H02K 1/28; H02K 7/14; H02K 1/148; H02K 21/16
See application file for complete search history.

(56) References Cited

U.S. PATENT DOCUMENTS

| 2010/0119390 A1* | 5/2010 | Baba ...................... H02K 21/16 |
| | | 310/156.53 |
| 2016/0190880 A1* | 6/2016 | Baba ...................... H02K 1/276 |
| | | 310/156.08 |

(Continued)

FOREIGN PATENT DOCUMENTS

| JP | 2003-274591 A | 9/2003 | |
| JP | 2008029095 A * | 2/2008 | ............. H02K 1/276 |

(Continued)

OTHER PUBLICATIONS

JP-2008029095-, Kikuchi, all pages (Year: 2008).*

(Continued)

*Primary Examiner* — Naishadh N Desai
(74) *Attorney, Agent, or Firm* — POSZ LAW GROUP, PLC

(57) ABSTRACT

A rotor core has a magnet insertion hole, an opening formed adjacent to the magnet insertion hole in the circumferential direction, and a thin wall portion formed between the opening and an outer circumference of the rotor core. A stator core has a length in the axial direction shorter than that of the rotor core. The rotor core has a facing region where the rotor core faces the stator core in the radial direction and an overhang region where the rotor core protrudes from the stator core in the axial direction. A distance from the center axis to a portion of the outer circumference located on a radially outer side of the magnet insertion hole is longer in at least part of the overhang region than in the facing region. The minimum width of the thin wall portion in the radial direction is the same in both regions.

14 Claims, 14 Drawing Sheets

(51) Int. Cl.
*H02K 1/14* (2006.01)
*H02K 1/28* (2006.01)
*H02K 7/14* (2006.01)

(56) References Cited

U.S. PATENT DOCUMENTS

2017/0294814 A1* 10/2017 Baba .................. H02K 7/14
2018/0138763 A1* 5/2018 Nakamura ............ H02K 7/14

FOREIGN PATENT DOCUMENTS

| JP | 2012-186901 A | 9/2012 | |
|----|---------------|--------|---|
| JP | 2013-009561 A | 1/2013 | |
| WO | WO-2016203563 A1 * | 12/2016 | ............ F25B 31/026 |

OTHER PUBLICATIONS

WO-2016203563-A1, Baba, all pages (Year: 2016).*
International Search Report dated Feb. 21, 2019, in corresponding International Application PCT/JP2019/006563 (and English translation).

* cited by examiner

MOTOR, COMPRESSOR, AND AIR CONDITIONER

CROSS REFERENCE TO RELATED APPLICATION

This application is a U.S. national stage application of International Patent Application No. PCT/JP2019/006563 filed on Feb. 21, 2019, the disclosure of which is incorporated herein by reference.

TECHNICAL FIELD

The present invention relates to a motor, a compressor, and an air conditioner.

BACKGROUND

A motor of a compressor is connected to a compression mechanism portion via a shaft. The compression mechanism portion repeatedly sucks and compresses refrigerant, causing a load on the motor to pulsate. Therefore, in order to stabilize the rotation of the motor, a configuration has been proposed in which a length of a rotor core in the axial direction is longer than a length of a stator core in the axial direction (see, for example, Patent Reference 1).

PATENT REFERENCE

Patent Reference 1

Japanese Patent Application Publication No. 2003-274591 (see FIG. 1)

In the above-described configuration, the rotor core protrudes from the stator core in the axial direction, and a distance from the stator core to this region of the rotor core is long. Consequently, part of magnetic flux from a permanent magnet embedded in the rotor core is not effectively interlinked with a coil wound on the stator core, and the motor efficiency is reduced.

SUMMARY

The present invention is intended to solve the above-described problem, and an object of the present invention is to stabilize the rotation of a rotor and to improve the motor efficiency.

A motor according to one aspect of the present invention is provided in a compressor. The motor includes a shaft connected to a compression mechanism portion of the compressor, a rotor core having a shaft hole to which the shaft is fixed, an outer circumference extending in a circumferential direction about a center axis of the shaft, a magnet insertion hole formed along the outer circumference, and an opening formed adjacent to the magnet insertion hole in the circumferential direction, the rotor core having a thin wall portion between the opening and the outer circumference, a permanent magnet inserted in the magnet insertion hole, a stator core provided so as to surround the rotor core from an outer side in a radial direction about the center axis, the stator core having a length in a direction of the center axis shorter than that of the rotor core, and a coil wound on the stator core. The rotor core has a facing region where the rotor core faces the stator core in the radial direction and an overhang region where the rotor core protrudes from the stator core in the direction of the center axis. A distance from the center axis to a portion of the outer circumference of the rotor core located on an outer side of the magnet insertion hole in the radial direction is longer in at least a part of the overhang region than in the facing region, and the minimum width of the thin wall portion in the radial direction is the same in the facing region and in the overhang region.

According to the present invention, since the rotor core protrudes from the stator core in the axial direction, an inertia of the rotor core can be increased to stabilize the rotation of the rotor. Further, the distance between the overhang region of the rotor core and the stator core is shortened, and thus the magnetic flux of the permanent magnet can be effectively interlinked with the coil, thereby improving the motor efficiency. That is, the rotation of the rotor can be stabilized, and the motor efficiency can be improved.

DETAILED DESCRIPTION

Embodiments of the present invention will be described in detail below with reference to the figures. In this regard, the present invention is not limited to these embodiments.

First Embodiment

Configuration of Compressor

Figure 1:
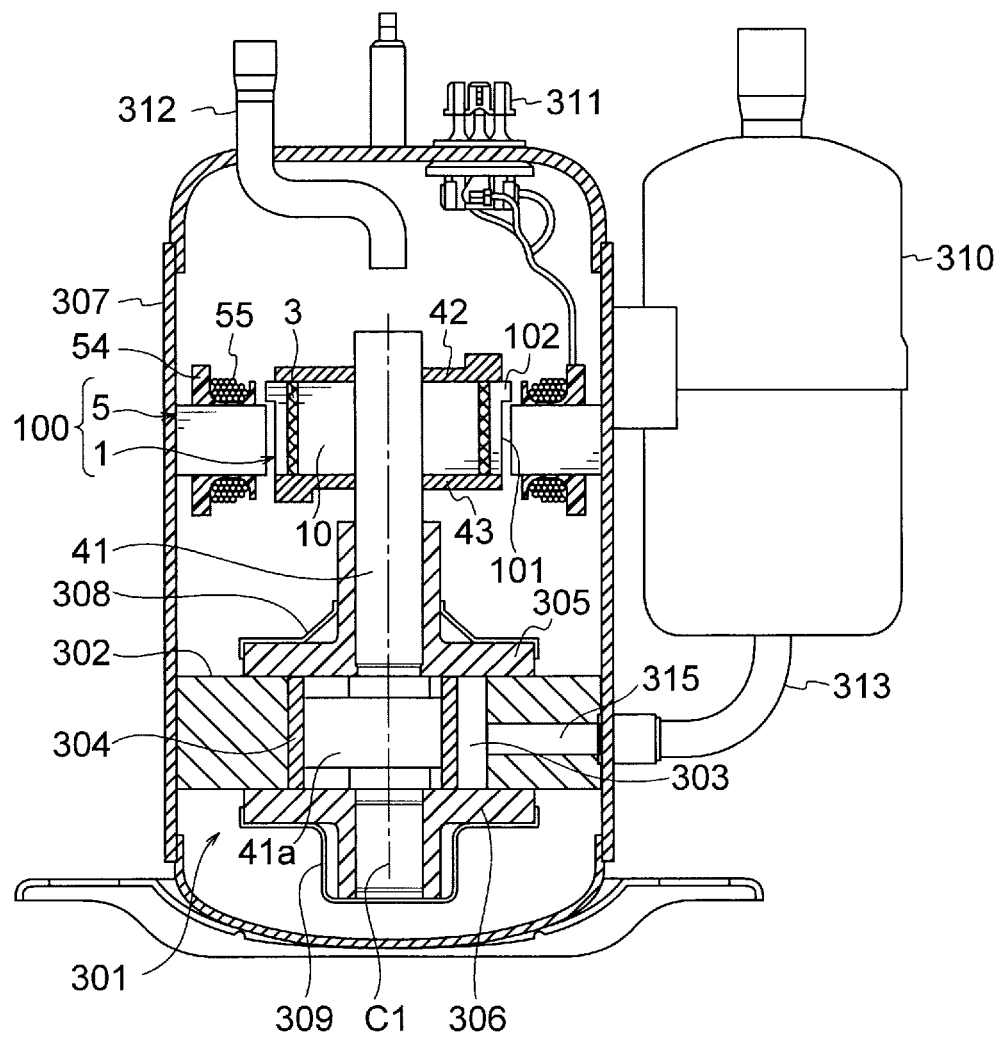
FIG. 1 is a longitudinal sectional view illustrating a compressor of a first embodiment.
Figure 16:
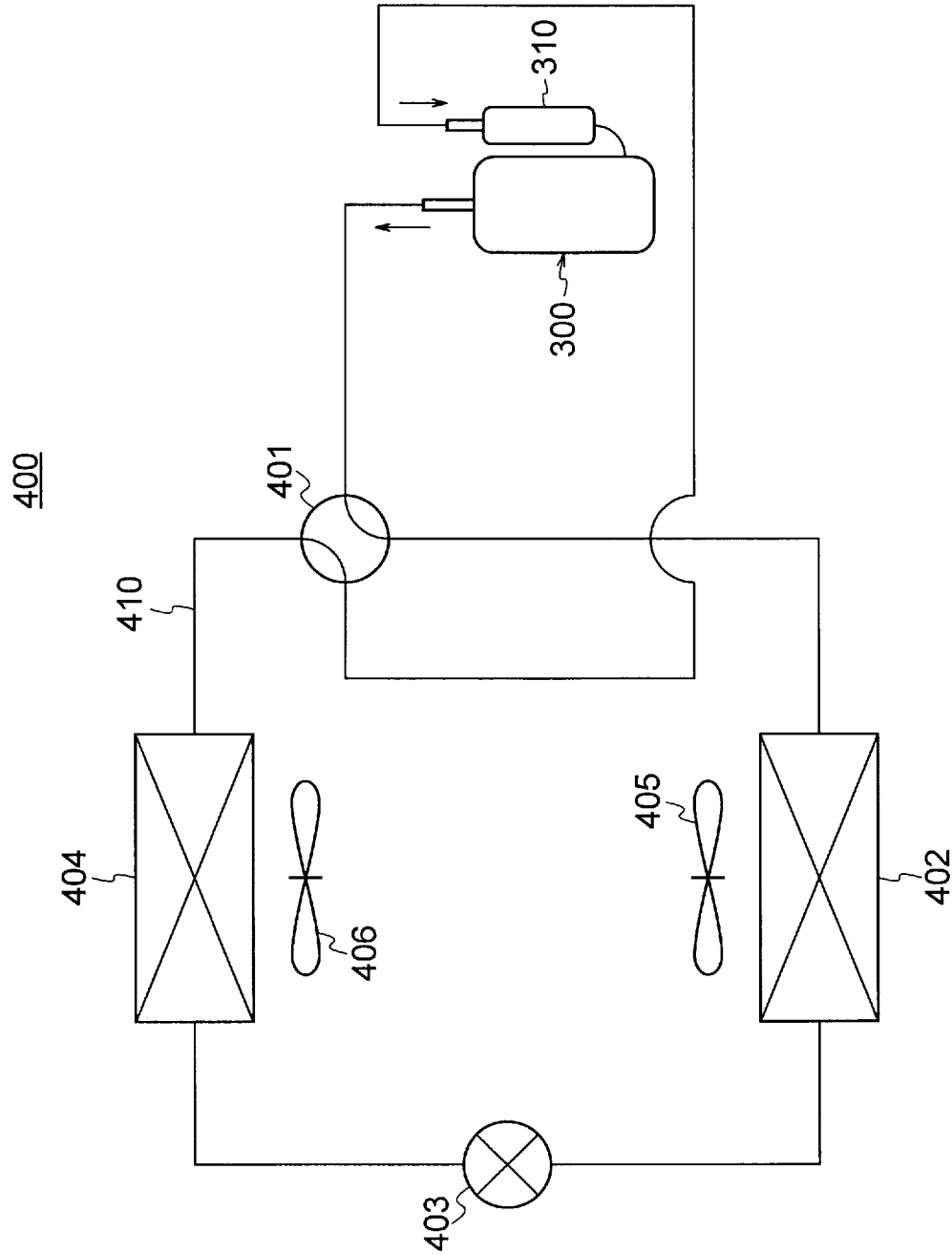
FIG. 16 is a diagram illustrating an air conditioner to which the compressor of each embodiment is applicable.

FIG. 1 is a longitudinal sectional view illustrating a compressor 300 of a first embodiment. The compressor 300 is a rotary compressor, and is used in, for example, an air conditioner 400 (FIG. 16). The compressor 300 includes a compression mechanism portion 301, a motor 100 that drives the compression mechanism portion 301, a shaft 41 that connects the compression mechanism portion 301 and the motor 100, and a sealed container 307 that accommodates these components. In this example, an axial direction of the shaft 41 is a vertical direction, and the motor 100 is disposed above the compression mechanism portion 301.

Hereinafter, a direction of a center axis C1, which is a rotation center of the shaft 41, is referred to as an "axial direction". A radial direction about the center axis C1 is referred to as a "radial direction". A circumferential direction about the center axis C1 is referred to as a "circumferential direction" and indicated by an arrow S in FIG. 2 and other figures. A sectional view on a plane parallel to the center axis C1 is referred to as a "longitudinal sectional view", whereas a sectional view on a plane perpendicular to the center axis C1 is referred to as a "cross-sectional view".

The sealed container 307 is a container formed of a steel sheet and has a cylindrical shell and a container top that covers the top of the shell. A stator 5 of the motor 100 is incorporated inside the shell of the sealed container 307 by shrink-fitting, press fitting, welding, or the like.

The container top of the sealed container 307 is provided with a discharge pipe 312 for discharging refrigerant to the outside and terminals 311 for supplying electric power to the motor 100. An accumulator 310 that stores refrigerant gas is attached to the outside of the sealed container 307. At the bottom of the sealed container 307, refrigerant machine oil for lubricating bearings of the compression mechanism portion 301 is stored.

The compression mechanism portion 301 includes a cylinder 302 having a cylinder chamber 303, a rolling piston 304 fixed to the shaft 41, a vane dividing the inside of the cylinder chamber 303 into a suction side and a compression side, and an upper frame 305 and a lower frame 306 which close both ends of the cylinder chamber 303 in the axial direction.

Both the upper frame 305 and the lower frame 306 have bearings that rotatably support the shaft 41. An upper discharge muffler 308 and a lower discharge muffler 309 are mounted to the upper frame 305 and the lower frame 306, respectively.

The cylinder 302 is provided with the cylinder chamber 303 having a cylindrical shape about the center axis C1. An eccentric shaft portion 41a of the shaft 41 is located inside the cylinder chamber 303. The eccentric shaft portion 41a has a center which is eccentric with respect to the center axis C1. The rolling piston 304 is fitted to the outer circumference of the eccentric shaft portion 41a. When the motor 100 rotates, the eccentric shaft portion 41a and the rolling piston 304 rotate eccentrically in the cylinder chamber 303.

The cylinder 302 is provided with a suction port 315 through which the refrigerant gas is sucked into the cylinder chamber 303. A suction pipe 313 that communicates with the suction port 315 is attached to the sealed container 307. The refrigerant gas is supplied from the accumulator 310 to the cylinder chamber 303 via the suction pipe 313.

The compressor 300 is supplied with a mixture of low-pressure refrigerant gas and liquid refrigerant from a refrigerant circuit of the air conditioner 400 (FIG. 16). If the liquid refrigerant flows into and is compressed by the compression mechanism portion 301, it may cause the failure of the compression mechanism portion 301. Thus, the accumulator 310 separates the refrigerant into the liquid refrigerant and the refrigerant gas, and supplies only the refrigerant gas to the compression mechanism portion 301.

For example, R410A, R407C, R22 or the like may be used as the refrigerant, but it is desirable to use refrigerant with a low global warming potential (GWP) from the viewpoint of preventing global warming. Examples of the low GWP refrigerant are described below.

(1) First, a halogenated hydrocarbon having a carbon-carbon double bond in its composition, for example, HFO (Hydro-Fluoro-Olefin)-1234yf ($CF_3CF=CH_2$), can be used. The GWP of HFO-1234yf is four.

(2) Alternatively, a hydrocarbon having a carbon-carbon double bond in its composition, for example, R1270 (propylene), may be used. The GWP of R1270 is three, which is lower than that of HFO-1234yf, but R1270 has higher flammability than HFO-1234yf.

(3) A mixture containing at least one of a halogenated hydrocarbon having a carbon-carbon double bond in its composition and a hydrocarbon having a carbon-carbon double bond in its composition may be used. For example, a mixture of HFO-1234yf and R32 may be used. HFO-1234yf described above is a low-pressure refrigerant and thus tends to increase a pressure drop, which may lead to reduction in the performance of a refrigeration cycle (particularly, an evaporator). Thus, it is practically desirable to use a mixture of HFO-1234yf with R32 or R41, which is a higher pressure refrigerant than HFO-1234yf.

Configuration of Motor

Figure 2:
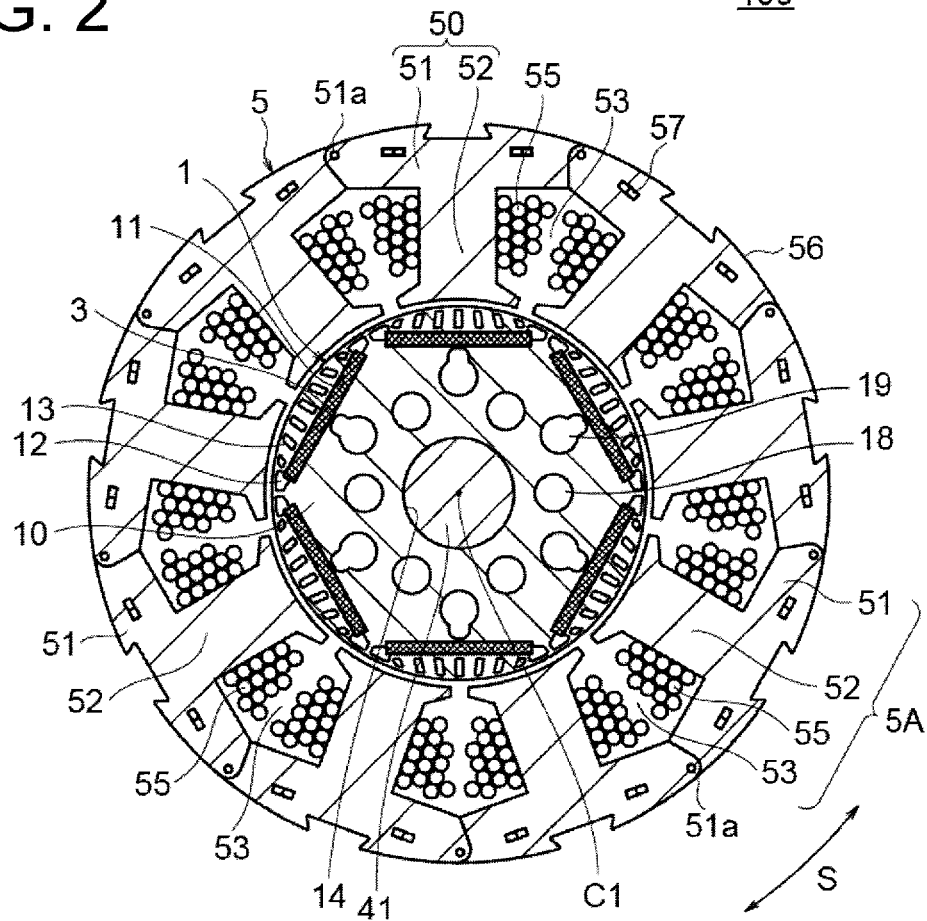
FIG. 2 is a cross-sectional view illustrating a motor of the first embodiment.

FIG. 2 is a cross-sectional view illustrating the motor 100. FIG. 2 is the cross-sectional view on a plane that passes through a facing region 101 (FIG. 3) described later. The motor 100 is called an inner-rotor type motor, and includes a rotor 1 and the stator 5 provided so as to surround the rotor 1 from an outer side in the radial direction. An air gap of, for example, 0.3 to 1.0 mm, is provided between the rotor 1 and the stator 5.

The rotor 1 has a cylindrical rotor core 10 and permanent magnets 3 attached to the rotor core 10. The rotor core 10 is formed of a plurality of steel laminations which are stacked in the axial direction and integrated together by crimping or the like. Each of the steel laminations is, for example, an electromagnetic steel sheet. The sheet thickness of each of the steel laminations is, for example, 0.1 to 0.7 mm, and is 0.35 mm in this example. A shaft hole 14 is formed at a center of the rotor core 10 in the radial direction. The above-described shaft 41 is fixed to the shaft hole 14 by shrink-fitting, press-fitting, bonding, or the like.

A plurality of magnet insertion holes 11 into which the permanent magnets 3 are inserted are formed along an outer circumference of the rotor core 10. One magnet insertion hole 11 corresponds to one magnetic pole, and a space between adjacent magnetic insertion holes 11 is an inter-pole portion. The number of magnet insertion holes 11 is six in this example. In other words, the number of magnetic poles is six. The number of magnetic poles is not limited to six and only needs to be two or more. Each magnet insertion hole 11 extends linearly in a plane perpendicular to the axial direction.

One permanent magnet 3 is inserted in each magnet insertion hole 11. The permanent magnet 3 is in the form of a flat-plate, and has a length in the axial direction of the rotor core 10, a width in the circumferential direction, and a thickness in the radial direction. The permanent magnet 3 is made of a rare earth magnet that contains, for example, neodymium (Nd), iron (Fe) and boron (B) as main components.

Each permanent magnet 3 is magnetized in the thickness direction. The permanent magnets 3 inserted into the adjacent magnet insertion holes 11 have opposite magnetic poles on the outer side in the radial direction. Each magnet insertion hole 11 may have, for example, a V shape. Two or more permanent magnets 3 may be disposed in each magnet insertion hole 11.

Figure 4A:
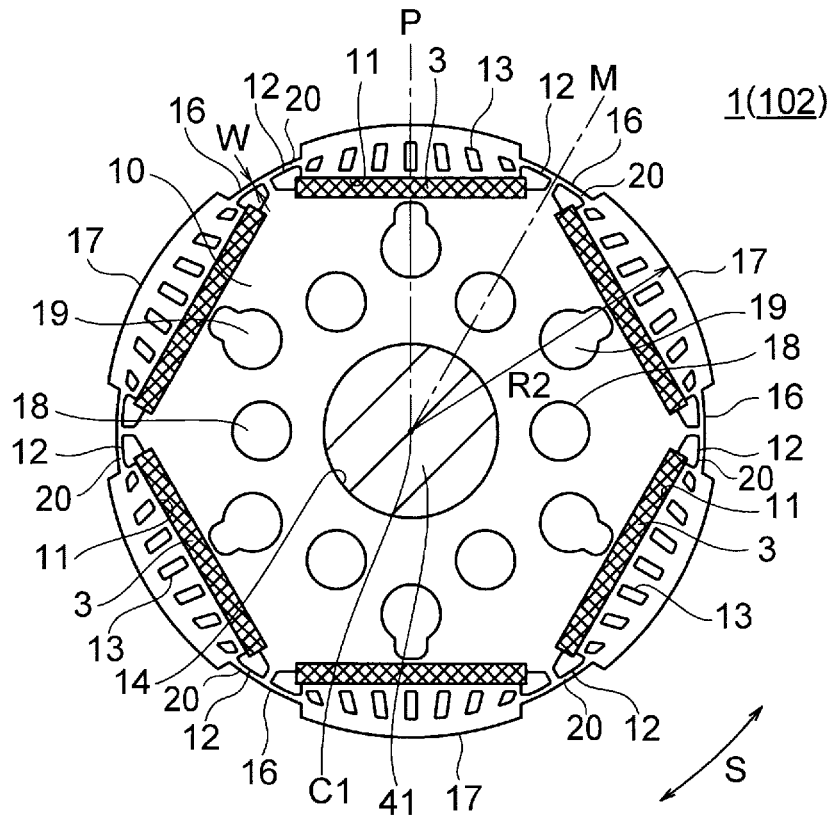
FIG. 4(A) is a cross-sectional view illustrating a cross-sectional shape of an overhang region of a rotor of the first embodiment.
Figure 4B:
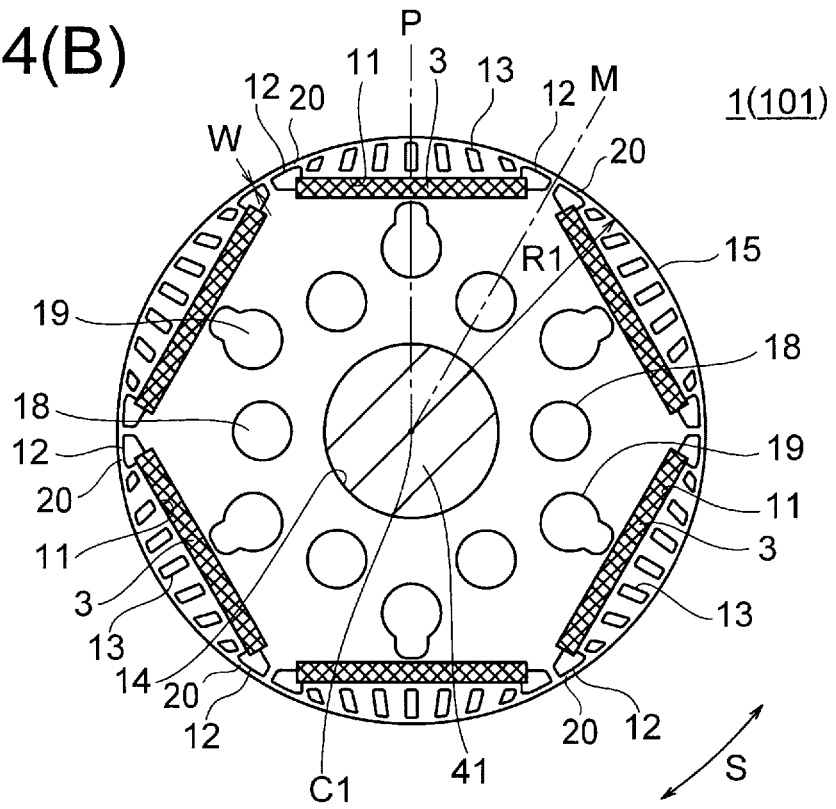
FIG. 4(B) is a cross-sectional view illustrating a cross-sectional shape of a facing region of the rotor of the first embodiment.

In the rotor core 10, an opening 12 (FIG. 4(B)) as a flux barrier is formed at each end of the magnet insertion hole 11 in the circumferential direction. A thin wall portion 20 (FIG. 4(B)) is formed between each opening 12 and the outer circumference of the rotor core 10. The thin wall portion 20 is formed so as to suppress short-circuit magnetic flux flowing between adjacent magnetic poles. The thin wall portion 20 has a minimum width W, which is the same as the sheet thickness of the steel lamination, for example. As the minimum width W of the thin wall portion 20 decreases, the effect of suppressing the short-circuit magnetic flux flowing between the adjacent magnetic poles increases.

In the rotor core 10, at least one slit 13 is formed between the magnetic insertion hole 11 and the outer circumference of the rotor core 10. The slit 13 is formed to reduce an increase in iron loss due to rotating magnetic field from the stator 5 and also reduce vibration and noise due to a magnetic attractive force. In this example, five slits 13 are symmetrically disposed with respect to a center of the magnet insertion hole 11 in the circumferential direction, i.e., a pole center. The number and arrangement of the slits 13 are not limited.

In the rotor core 10, through holes 18 and 19 are formed on the inner side with respect to the magnet insertion hole 11 in the radial direction. Each of the through holes 18 is formed at a position corresponding to the inter-pole portion in the circumferential direction. Each of the through holes 19 is formed at a position corresponding to the pole center in the circumferential direction and on the outer side with respect to the through hole 18 in the radial direction. The through holes 18 and 19 are used as airholes through which the refrigerant passes or as holes through which jigs are inserted. Although six through holes 18 and six through holes 19 are formed in this example, the number and arrangement of the through holes 18 and 19 are not limited.

A balance weight 42 is fixed to an end of the rotor core 10 in the axial direction, and a balance weight 43 is fixed to the other end of the rotor core 10 in the axial direction. The balance weights 42 and 43 are disc-shaped and made of brass, for example. The balance weights 42 and 43 (FIG. 1) are provided to increase the inertia of the rotor 1 and to improve the rotational balance of the rotor 1.

The stator 5 includes a stator core 50 and coils 55 wound on the stator core 50. The stator core 50 is formed of a plurality of steel laminations which are stacked in the axial direction and integrated together by crimping or the like. Each of the steel laminations is, for example, an electromagnetic steel sheet. The sheet thickness of each of the steel laminations is 0.1 to 0.5 mm, and is 0.35 mm in this example.

The stator core 50 has a yoke 51 having an annular shape about the center axis C1 and a plurality of teeth 52 extending inward in the radial direction from the yoke 51. The teeth 52 are arranged at regular intervals in the circumferential direction. The number of teeth 52 is nine in this example. The number of teeth 52 is not limited to nine, and only needs to be two or more. A slot 53, which is a space to accommodate the coil 55, is formed between the teeth 52 adjacent to each other in the circumferential direction. The number of slots 53 is the same as the number of teeth 52, which is nine in this example. That is, the ratio of the number of magnetic poles to the number of slots in the motor 100 is 2:3.

In this example, the stator core 50 has a configuration in which a plurality of split cores 5A each including one tooth 52 are connected together in the circumferential direction. The split cores 5A are connected to one another at connecting portions 51a provided at an outer circumferential end of the yoke 51. This configuration makes it possible to wind the coils 55 around the teeth 52 while the stator core 50 is expanded in a band shape. The stator core 50 is not limited to the configuration in which the split cores 5A are connected.

The coil 55 is formed of a magnet wire wound around each tooth 52 in a concentrated winding. The wire diameter of the magnet wire is, for example, 0.8 mm. The number of turns of the coil 55 around one tooth 52 is, for example, 70 turns. The number of turns and the wire diameter of the coil 55 are determined according to required specifications of the motor 100 such as the number of revolutions and torque, a supplied voltage, or a sectional area of the slot 53. The coils 55 have winding portions of three phases, i.e., a U-phase, a V-phase, and a W-phase, which are connected in Y-connection.

An insulating portion 54 (FIG. 1) formed of resin such as liquid crystal polymer (LCP) is provided between the stator core and the coil 55. The insulating portion 54 is formed by attaching a resin molded body to the stator core 50 or integrally molding the stator core 50 with resin. Although not illustrated in FIG. 2, an insulating film having a thickness of 0.1 to 0.2 mm and formed of resin such as polyethylene terephthalate (PET) is provided on the inner surface of the slot 53.

Figure 3:
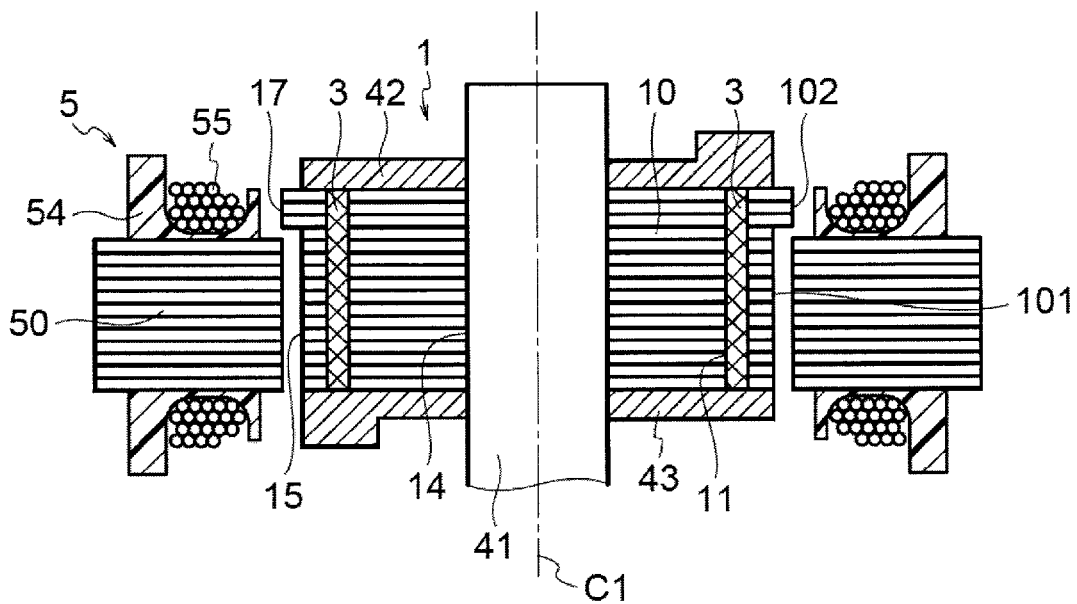
FIG. 3 is a longitudinal sectional view illustrating the motor of the first embodiment.

FIG. 3 is a longitudinal sectional view illustrating the motor 100. Ends of the rotor core 10 and the stator core 50 on the compression mechanism portion 301 (FIG. 1) side, i.e., lower ends of the rotor core 10 and the stator core 50, are located at the same position in the axial direction. A length of the stator core 50 in the axial direction is, for example, 25 mm, whereas a length of the rotor core 10 in the axial direction is, for example, 32 mm. Thus, the rotor core 10 protrudes from the stator core 50 on the opposite side to the compression mechanism portion 301 in the axial direction by, for example, 7 mm (FIG. 1).

That is, the rotor core 10 has the facing region 101 where the rotor core 10 faces the stator core 50 and an overhang region 102 where the rotor core 10 protrudes from the stator core 50 in the axial direction. The overhang region 102 is a region within a range of 7 mm from an upper end of the rotor core 10, i.e., an end of the rotor core 10 opposite to the compression mechanism portion 301.

In this example, an outer diameter of the stator core 50 is 110 mm, and an inner diameter of the stator core 50 is 56 mm. An outer diameter of the facing region 101 of the rotor core 10 is 54.5 mm. Thus, an air gap of 0.75 mm is formed between the facing region 101 of the rotor core 10 and the stator core 50.

An outer diameter of a part of the overhang region 102 within a range of 6 mm from the upper end of the rotor core 10 is 60 mm. That is, the rotor core 10 hangs over the stator core 50 as illustrated in FIG. 3.

FIG. 4(A) is a cross-sectional view illustrating a cross-sectional shape of the overhang region 102 of the rotor 1, and FIG. 4(B) is a cross-sectional view illustrating a cross-sectional shape of the facing region 101 of the rotor 1. In FIGS. 4(A) and 4(B), reference character P denotes the pole center of the rotor 1, and reference character M denotes the inter-pole portion.

As illustrated in FIG. 4(B), an outer circumference 15 of the facing region 101 of the rotor 1 has a circular shape about the center axis C1. That is, a distance R1 from the center axis C1 to the outer circumference 15 is constant in the circumferential direction. The minimum width W of the thin wall portion 20 between the opening 12 and the outer circumference 15 is 0.35 mm, which is the same as the sheet thickness of the steel lamination.

As illustrated in FIG. 4(A), the outer circumference of the overhang region 102 of the rotor 1 includes outer circumference portions 17 located on the outer side of the magnet insertion holes 11 in the radial direction and outer circumference portions 16 located on the outer side of the openings 12 in the radial direction. Each outer circumference portion 17 includes the pole center P, while each outer circumference portion 16 includes the inter-pole portion M.

The outer circumference portions 16 and 17 are both formed in the circumferential direction about the center axis C1. The outer circumference portion 17 protrudes outward in the radial direction with respect to the outer circumference portion 16. A distance R2 from the center axis C1 to the outer circumference portion 17 is longer than the above-described distance R1.

Meanwhile, a distance from the center axis C1 to the outer circumference portion 16 is the same as the above-described distance R1. Thus, the minimum width W of the thin wall portion 20 between the opening 12 and the outer circumference portion 16 is the same as the minimum width W of the thin wall portion 20 in the facing region 101, and is 0.35 mm, for example.

Figure 5:
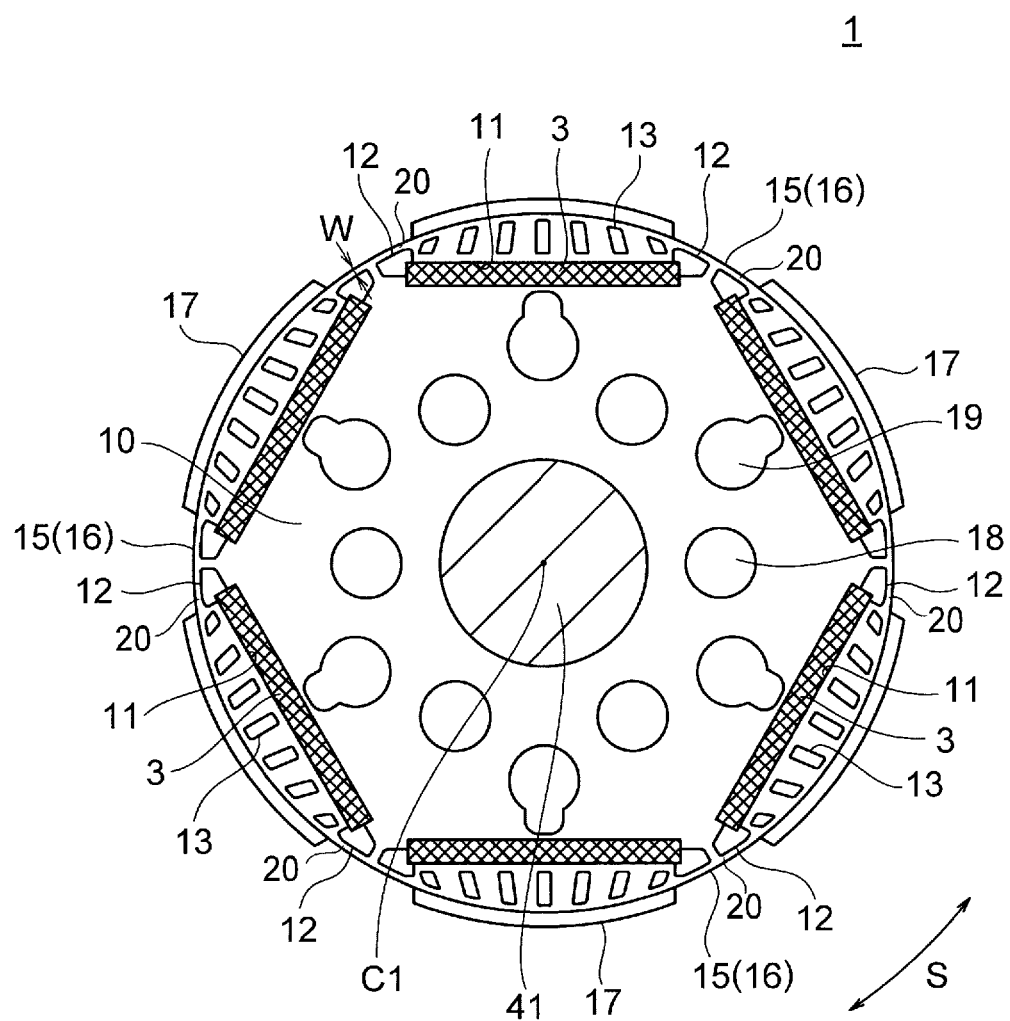
FIG. 5 is a diagram illustrating the cross-sectional shapes of the overhang region and the facing region of the rotor of the first embodiment in an overlapping manner.

FIG. 5 is a diagram illustrating the facing region 101 and the overhang region 102 of the rotor core 10 in such a manner that the regions 101 and 102 overlap each other. In the overhang region 102 of the rotor core 10, the outer circumference portion located on the outer side in the radial direction of the magnet insertion hole 11 protrudes outward in the radial direction with respect to the outer circumference 15 of the facing region 101.

In the overhang region 102 of the rotor core 10, the outer circumference portion 16 located on the outer side in the radial direction of the thin wall portion 20 is located at the same position in the radial direction as the outer circumference 15 in the facing region 101.

That is, the maximum outer diameter of the overhang region 102 of the rotor core 10 is larger than the maximum outer diameter of the facing region 101, but the minimum width W of the thin wall portion 20 is the same in the overhang region 102 and in the facing region 101.

When the weight of the cylindrical rotor core 10 is represented by "m", the radius of the cylindrical rotor core 10 is represented by "r", the length of the cylindrical rotor core 10 in the axial direction is represented by "h", and the density of the rotor core 10 is represented by "ρ", $m = \rho \times \pi r^2 \times h$ is satisfied. The inertia I of a cylinder about the center axis C1 is expressed as $I = \frac{1}{2} \times (mr^2) = \pi/2 \times \rho \times h \times r^4$. That is, the inertia of the rotor core 10 is proportional to the length h in the axial direction and also proportional to the fourth power of the radius r.

Thus, the inertia of the rotor core 10 can be increased by increasing the outer diameter of the overhang region 102 of the rotor core 10. This makes it possible to stabilize the rotation of the rotor core 10 against load pulsation of the compression mechanism portion 301 and to suppress vibration and noise.

Further, the distance between the rotor core 10 and the stator core 50 is reduced by increasing the outer diameter of the overhang region 102 of the rotor core 10. This increases the amount of the magnetic flux of the permanent magnets 3 interlinked with the coils 55. Thus, the motor efficiency can be improved, and the motor 100 can be further made compact.

In addition, since the minimum width W of the thin wall portion 20 is the same in the overhang region 102 and in the facing region 101, short-circuit magnetic flux between adjacent magnetic poles can be suppressed.

In the manufacturing process of the compressor 300, each of the stator 5 and the compression mechanism portion 301 is fixed to the inside of the cylindrical shell of the sealed container 307 by shrink-fitting. The shaft 41 is incorporated in the compression mechanism portion 301 in advance. Then, in a state where the shaft hole 14 is widened by heating the rotor 1, the shaft 41 is fitted into the shaft hole 14 of the rotor 1 while the rotor 1 is inserted into the inside of the stator 5.

The overhang region 102 of the rotor core 10 has a large outer diameter but is formed on the opposite side to the compression mechanism portion 301. Thus, the rotor 1 can be inserted into the inside of the stator 5 from the opposite side to the compression mechanism portion 301, and thus the compressor 300 can be easily assembled and the productivity can be improved.

Operation of Compressor

Next, the operation of the compressor 300 will be described. When current is supplied to the coils 55 of the stator 5 through the terminals 311, the rotating magnetic field generated by the current and the magnetic field of the permanent magnets 3 of the rotor 1 generate attractive and repulsive forces between the stator 5 and the rotor 1, causing the rotor 1 to rotate. The shaft 41 fixed to the rotor 1 also rotates accordingly.

Low-pressure refrigerant gas is sucked from the accumulator 310 into the cylinder chamber 303 of the compression mechanism portion 301 through the suction port 315. Within the cylinder chamber 303, the eccentric shaft portion 41a of the shaft 41 and the rolling piston 304 attached to the eccentric shaft portion 41a rotate eccentrically, thereby compressing the refrigerant in the cylinder chamber 303.

The refrigerant compressed in the cylinder chamber 303 is discharged into the sealed container 307 through a discharge port (not shown) and the discharge mufflers 308 and 309. The refrigerant discharged into the sealed container 307 rises in the sealed container 307 through the through holes 18 and 19 of the rotor core 10 and the like, and is then discharged through the discharge pipe 312 and supplied to a refrigerant circuit of the air conditioner 400 (FIG. 16).

Function

A function of the first embodiment will be described by comparison with a comparative example. In the compressor 300, the compression mechanism portion 301 repeatedly sucks and compresses the refrigerant, causing a load on the motor 100 to pulsate. In particular, in the compact motor 100, the rotor 1 is small in size and light in weight, and thus the inertia is small. Therefore, the rotation of the rotor 1 may be unstable due to the load pulsation.

In order to increase the inertia of the rotor 1, it is necessary to increase the size of the rotor core 10. However, in order to increase the outer diameter of the rotor core 10, it is also necessary to increase the inner diameter of the stator core 50 surrounding the rotor core 10.

When the inner diameter of the stator core 50 is increased, the area of the slots 53 decreases, and accommodation spaces for the coils 55 are reduced. Thus, it is necessary to reduce the cross-sectional area of conductors of the coils 55, which increases copper loss and leads to reduction in the motor efficiency. In addition, when both the inner and outer diameters of the stator core 50 are increased, the sealed container 307 into which the stator core 50 is fitted needs to be made larger, which increases the size of the compressor 300.

Therefore, it is conceivable to increase the inertial of the rotor 1 by making the rotor core 10 protrude from the stator core 50 in the axial direction.

Figure 6A:
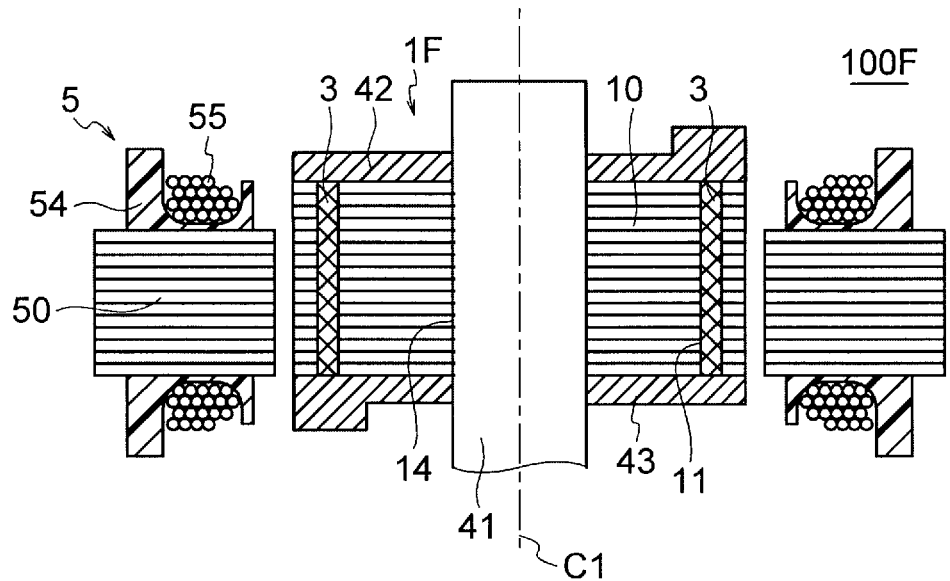
FIG. 6(A) is a longitudinal sectional view illustrating a motor of a comparative example.
Figure 6B:
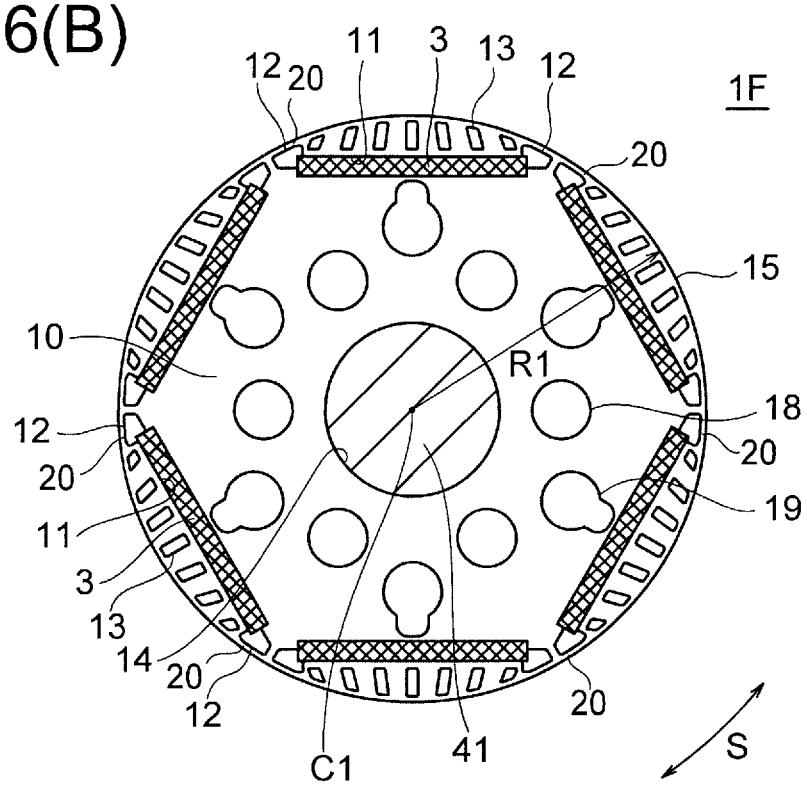
FIG. 6(B) is a cross-sectional view illustrating a rotor of the comparative example.

FIG. 6(A) is a longitudinal sectional view illustrating a motor 100F of a comparative example. FIG. 6(B) is a cross-sectional view illustrating a rotor 1F of the motor 100F of the comparative example. For convenience of description, components of the motor 100F in the comparative example are denoted with the same reference characters as those of the first embodiment.

In the motor 100F of the comparative example, the rotor core 10 of the rotor 1F protrudes from the stator core 50 in the axial direction, but the outer diameter of the rotor core 10 is constant in the axial direction. That is, the rotor 1F has the cross-sectional shape shown in FIG. 6(B) at any position in the axial direction. The cross-sectional shape illustrated in FIG. 6(B) is the same as the cross-sectional shape of the facing region 101 of the rotor 1 illustrated in FIG. 4(B).

In the motor 100F of the comparative example, the inertia of the rotor 1F is increased by increasing the length of the rotor core 10 in the axial direction. However, the distance from the stator core 50 to the overhang region where the rotor core 10 protrudes from the stator core 50 is long. As a result, part of the magnetic flux of the permanent magnets 3 is not effectively interlinked with the coils 55, and thus the motor efficiency is reduced.

On the other hand, in the first embodiment, the inertia of the rotor core 10 can be increased by increasing the outer diameter of the overhang region 102 of the rotor core 10. This makes it possible to stabilize the rotation of the rotor core 10 against the load pulsation of the compression mechanism portion 301.

In addition, since the distance of the overhang region 102 of the rotor core 10 from the stator core 50 is shortened, the amount of the magnetic flux of the permanent magnet 3 interlinked with the coils 55 increases, thus the motor efficiency is improved.

In the comparative example illustrated in FIGS. 6(A) and 6(B), the length of the stator core 50 in the axial direction is 25 mm, whereas the length of the rotor core 10 in the axial direction is 35 mm. The overhang amount is 10 mm. The outer diameter of the stator core 50 is 110 mm, the inner diameter of the stator core 50 is 56 mm, and the outer diameter of the rotor core 10 is 54.5 mm.

In contrast, in a particular example of the first embodiment, the length of the stator core 50 in the axial direction is 25 mm, and the length of the rotor core 10 in the axial direction is 32 mm. The overhang amount is 7 mm. The outer diameter of the stator core 50 is 110 mm, and the inner diameter of the stator core 50 is 56 mm. Furthermore, the outer diameter of the facing region 101 of the rotor core 10 is 54.5 mm, and the outer diameter of a part of the overhang region 102, specifically, within a range of 6 mm from the upper end of the rotor core 10, is 60 mm.

In this case, the inertia of the rotor core 10 of the first embodiment is equal to the inertia of the rotor core 10 of the comparative example. The length of the rotor core 10 of the first embodiment in the axial direction is 32 mm, while the length of the rotor core 10 of the comparative example in the axial direction is 35 mm. The inertia equal to that of the comparative example can be obtained while shortening the length of the rotor core in the axial direction by 8.5%. Further, the amount of the magnetic flux of the permanent magnets 3 in the overhang region 102 of the rotor core 10 interlinked with the coils 55 of the first embodiment increases by 8% as compared to that of the comparative example.

Thus, in the first embodiment, the rotation of the rotor 1 can be stabilized by increasing the inertia while shortening the length of the rotor core 10 in the axial direction, and the motor efficiency can be improved by increasing the amount of the magnetic flux of the permanent magnets 3 interlinked with the coils 55.

If the outer diameter of the overhang region 102 of the rotor core 10 is simply increased, the minimum width of the thin wall portion 20 between the outer circumference of the rotor core and the opening 12 increases, and thus the short-circuit magnetic flux between adjacent magnetic poles cannot be sufficiently reduced and the motor efficiency decreases.

In the first embodiment, the minimum width W of the thin wall portion 20 of the rotor core 10 is the same in the facing region 101 and in the overhang region 102, and thus the short-circuit magnetic flux between adjacent magnetic poles can be suppressed. Thus, the motor efficiency can be improved.

The rotor core 10 is formed by stacking the stamped steel laminations. Each steel lamination in the overhang region 102 of the rotor core 10 differs from the steel lamination in the facing region 101 only in the shape of the outer circumference portions 16 (FIG. 4(A)). Thus, when the steel lamination for the overhang region 102 of the rotor core 10 is stamped, the same blades as those used to stamp the steel lamination for the facing region 101 can be used, except for blades to stamp the outer circumference portions 16. Thus, the productivity can be improved.

A magnetic attractive force acts between the rotor core 10 and the stator core 50 to attract the rotor core 10 toward the center of the stator core 50 in the axial direction. Since the rotor core 10 protrudes on the opposite side to the compression mechanism portion 301, the magnetic attractive force is applied to the rotor core 10 in a direction to bias the rotor core 10 against the compression mechanism portion 301. Thus, the rotation of the rotor 1 can be further stabilized against the load pulsation of the compression mechanism portion 301.

In the above description, the region in a range of 6 mm from the upper end of the overhang region 102 has the larger outer diameter. That is, it is not necessary that the entire overhang region 102 has the larger outer diameter. It is sufficient that the outer diameter of at least a part of the overhang region 102 is larger than the outer diameter of the facing region 101.

Figure 7A:
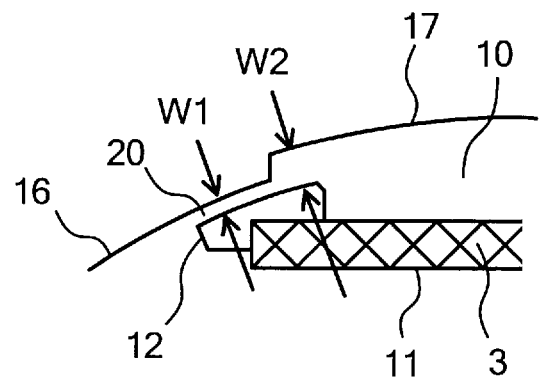
FIG. 7(A) and FIG. 7(B) are diagrams illustrating other examples of a thin wall portion of the first embodiment.

In FIGS. 4(A) and 4(B), each thin wall portion 20 has the constant width, but the width of the thin wall portion 20 is not necessarily constant. For example, as illustrated in FIG. 7(A), the thin wall portion 20 may have a plurality of widths W1 and W2. In this case, the narrowest width of these widths corresponds to the minimum width W described above.

Figure 7B:
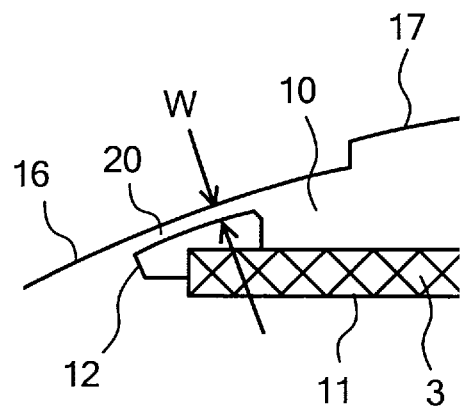

In FIG. 4(A), each outer circumference portion 17 has a width in the circumferential direction equal to an interval between two openings 12 on both sides of the magnet insertion hole 11. However, for example, as illustrated in FIG. 7(A), the outer circumference portion 17 may be formed longer than the outer circumference portion 17 shown in FIG. 4(A). Conversely, as illustrated in FIG. 7(B), the outer circumference portion 17 may be formed shorter than the outer circumference portion 17 shown in FIG. 4(A).

The outer circumference of the facing region 101 of the rotor core 10 has a circular shape in FIG. 4(B), but may have other shapes. For example, the outer circumference may have a flower circle shape whose outer diameter is maximum at the pole centers and is minimum at the inter-pole portions.

Effects of Embodiment

As described above, in the first embodiment, the rotor core 10 has the facing region 101 where the rotor core faces the stator core 50 and the overhang region 102 where the rotor core protrudes from the stator core 50 in the axial direction. The distance from the center axis C1 to a portion of the outer circumference of the rotor core 10 located on the outer side of the magnet insertion hole 11 in the radial direction is longer in at least a part of the overhang region 102 than in the facing region 101. The minimum width W of the thin wall portion 20 in the radial direction is the same in the facing region 101 and in the overhang region 102.

Thus, the inertia can be increased while shortening the length of the rotor core 10 in the axial direction. Accordingly, the rotation of the rotor 1 can be stabilized against the load pulsation of the compression mechanism portion 301, and vibration and noise can be suppressed. Furthermore, the amount of magnetic flux of the permanent magnets 3 interlinked with the coils 55 is increased, and the short-circuit magnetic flux is suppressed by the thin wall portion 20, so that the motor efficiency can be improved. As a result, the rotation of the rotor 1 can be stabilized, the motor efficiency can be improved, and the small-sized and highly-reliable motor 100 can be obtained.

In at least a part of the overhang region 102 of the rotor core 10, the outer circumference portion 17 located on the outer side in the radial direction of the magnet insertion hole 11 protrudes outward in the radial direction with respect to the outer circumference portion 16 located on the outer side in the radial direction of the opening 12. Thus, the inertia can be increased and the short-circuit magnetic flux can be suppressed with a simple configuration.

Second Embodiment

Figure 8:
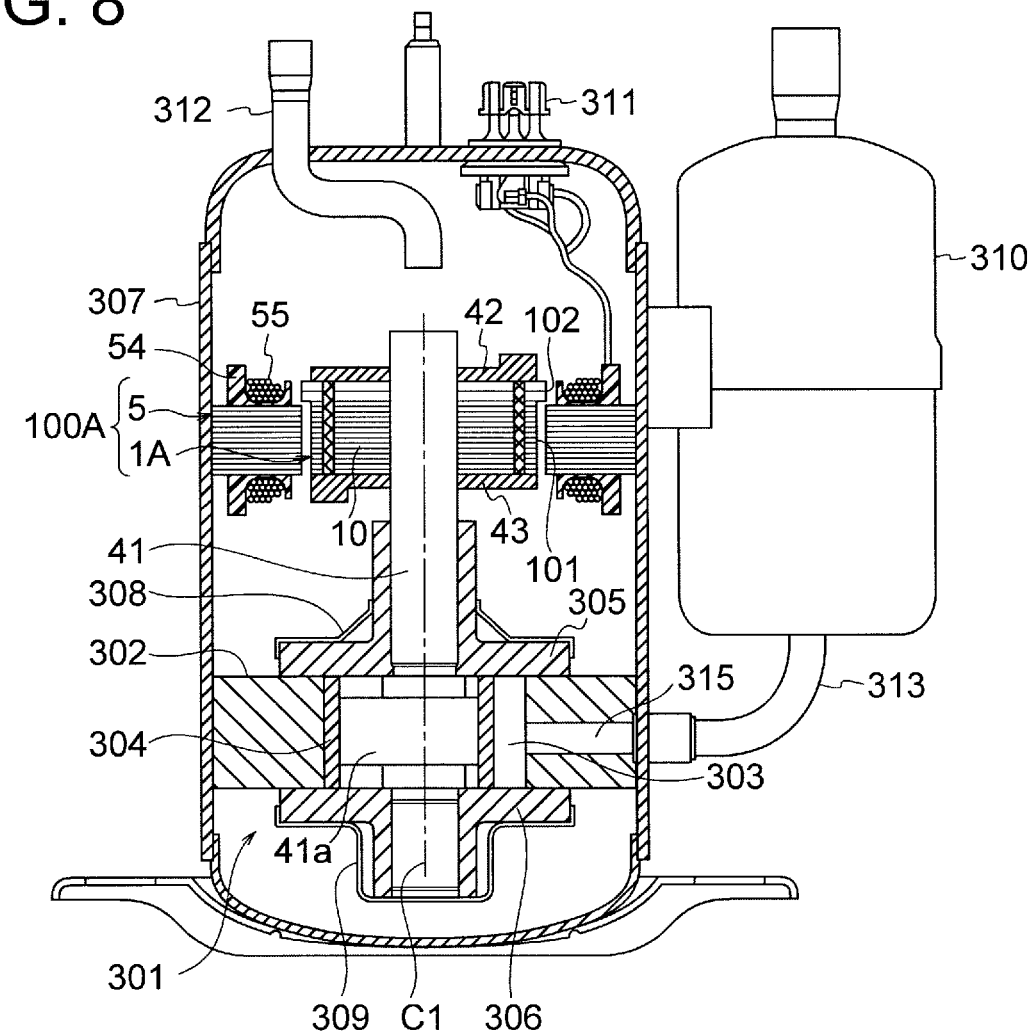
FIG. 8 is a longitudinal sectional view illustrating a compressor of a second embodiment.
Figure 9:
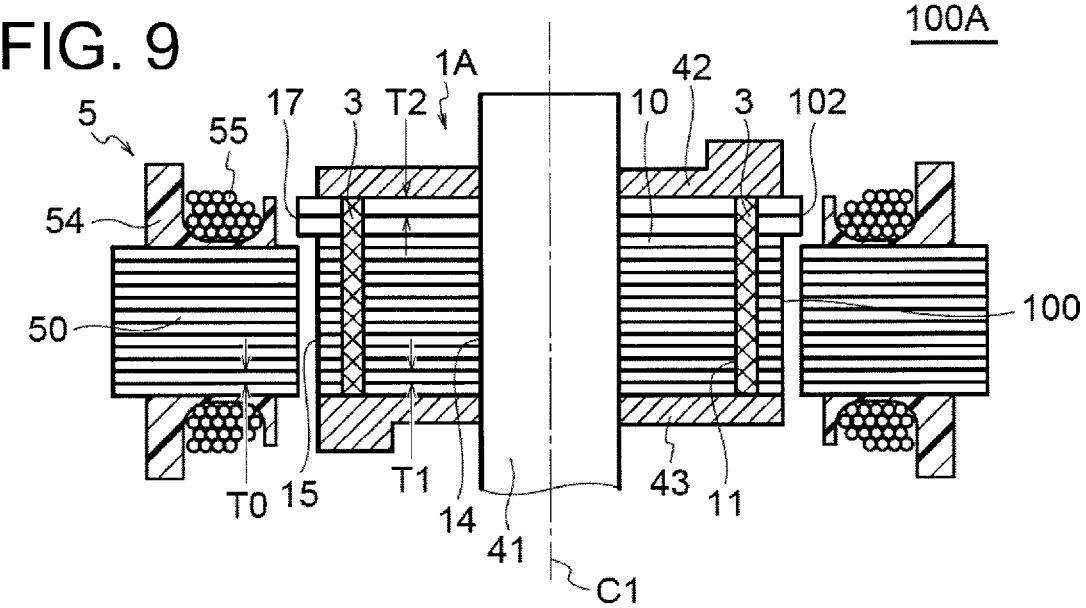
FIG. 9 is a longitudinal sectional view illustrating a motor of the second embodiment.

FIG. 8 is a longitudinal sectional view illustrating a compressor 300A of a second embodiment. FIG. 9 is a longitudinal sectional view illustrating a motor 100A, of the compressor 300A of the second embodiment. In the second embodiment, the sheet thickness of each of the steel laminations constituting the rotor core 10 of a rotor 1A differs between the facing region 101 and the overhang region 102.

More specifically, as illustrated in FIG. 9, the sheet thickness T2 of the steel lamination in the overhang region 102 of the rotor core 10 is thicker than the sheet thickness T1 of the steel lamination in the facing region 101 of the rotor core 10.

The cross-sectional shapes of the overhang region 102 and the facing region 101 of the rotor core 10 are as described in the first embodiment with reference to FIGS. 4(A) and 4(B).

As the thickness of the steel laminations decreases, the number of steel laminations, i.e., the stacking number, constituting the stacking body having the same length in the axial direction increases. Gaps are formed between the steel laminations in the axial direction. Thus, assuming that the length of the stacking body in the axial length is the same, as the stacking number increases, the proportion of the gaps increases, and the weight of the stacking body decreases. Therefore, in order to increase the inertia, it is desirable to thicken the sheet thickness of the steel lamination.

In the facing region 101 of the rotor core 10, the amount of change in the magnetic flux due to the rotating magnetic field of the coils 55 in the stator 5 is large. In order to suppress the eddy current loss caused by the change in the magnetic flux, it is desirable that the sheet thickness of each steel lamination is thin. In contrast, in the overhang region 102 of the rotor core 10, the amount of change in the magnetic flux is smaller than in the facing region 101, so that the eddy current loss is less likely to occur even when the sheet thickness of the steel laminations is thickened.

For this reason, in the second embodiment, the sheet thickness T2 of the steel lamination in the overhang region 102 of the rotor core 10 is made thicker than the sheet thickness T1 of the steel lamination in the facing region 101 of the rotor core 10. Thus, the inertia of the rotor core 10 can be increased while suppressing an increase in the eddy current loss.

Due to the above-described relationship between the sheet thicknesses T1 and T2, the weight per unit length of the rotor core 10 in the axial direction is greater in the overhang region 102 than in the facing region 101. That is, the inertia per unit length of the rotor core 10 in the axial direction is greater in the overhang region 102 than in the facing region 101.

In this regard, it is not necessary that the sheet thickness of each of all the steel laminations in the overhang region 102 of the rotor core 10 is thicker than the sheet thickness of the steel lamination in the facing region. It is sufficient that the sheet thickness of at least one steel lamination in the overhang region 102 is thicker than the sheet thickness T1 of the steel lamination in the facing region 101.

The motor 100A and the compressor 300A of the second embodiment are configured in the same manner as the motor 100 and the compressor 300 of the first embodiment except for the points described above.

As described above, in the second embodiment, the sheet thickness T2 of the steel lamination in at least a part of the overhang region 102 of the rotor core 10 is thicker than the sheet thickness T1 of the steel lamination in the facing region 101 of the rotor core 10. Thus, the inertia of the rotor core 10 can be increased while suppressing an increase in the eddy current loss. That is, the rotation of the rotor 1A can be stabilized, and the motor efficiency can be improved.

Third Embodiment

Figure 10A:
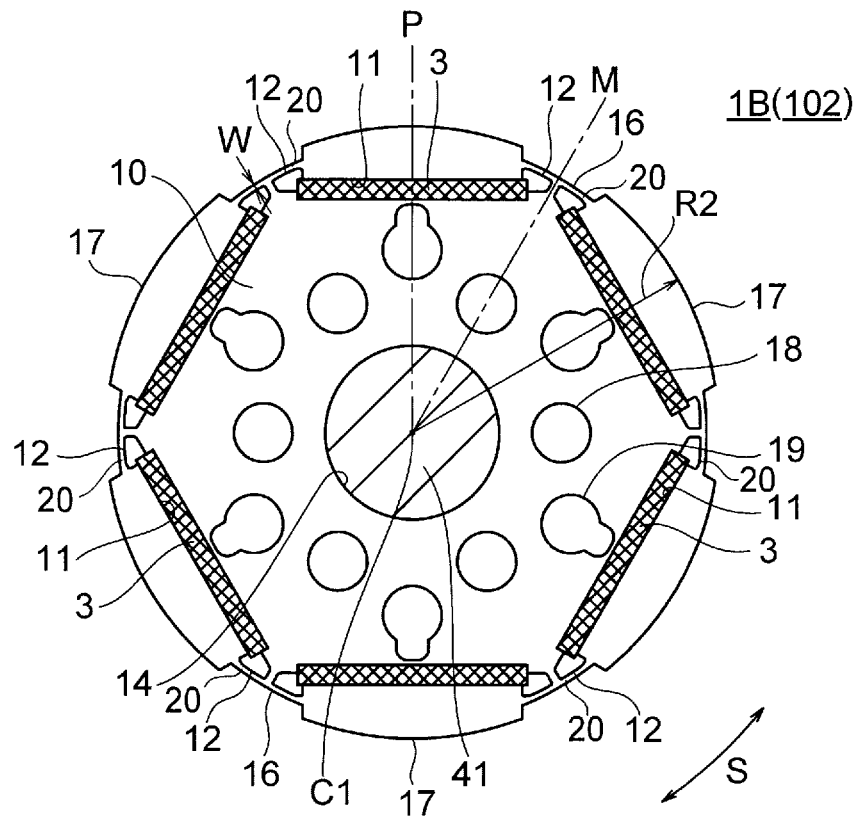
FIG. 10(A) is a cross-sectional view illustrating a cross-sectional shape of an overhang region of a rotor of a third embodiment.
Figure 10B:
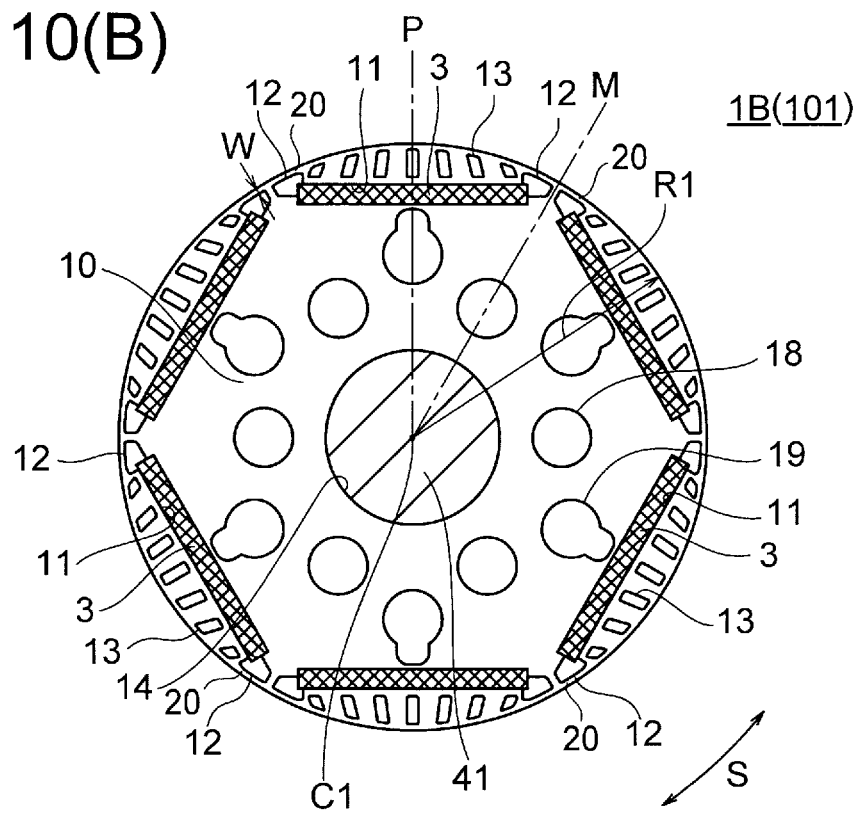
FIG. 10(B) is a cross-sectional view illustrating a cross-sectional shape of a facing region of the rotor of the third embodiment.

FIG. 10(A) is a sectional view of the overhang region 102 of a rotor 1B of a motor of a third embodiment, and FIG. 10(B) is a sectional view of the facing region 101 of the motor of the third embodiment. In the third embodiment, the number of slits in the rotor core 10 of the rotor 1B differs between the facing region 101 and the overhang region 102.

More specifically, as illustrated in FIG. 10(B), five slits 13, the number of which is defined as a first number, are formed between the magnetic insertion hole 11 and the outer circumference 15 in the facing region 101 of the rotor core 10.

Meanwhile, as illustrated in FIG. 10(A), no slit 13 is formed between the magnetic insertion hole 11 and the outer circumference 15 in the overhang region 102 of the rotor core 10. In other words, zero slit 13, the number of which is defined as a second number, is formed between the magnetic insertion hole 11 and the outer circumference 15 in the overhang region 102 of the rotor core 10.

In the facing region 101 of the rotor core 10, the amount of change in the magnetic flux due to the rotating magnetic field of the coils 55 of the stator 5 is large, which may cause iron loss in the rotor core 10 or may cause vibration and noise due to the magnetic attractive force. In contrast, in the overhang region 102 of the rotor core 10, the amount of change in the magnetic flux is smaller than in the facing region 101, so that iron loss or vibration and noise due to the magnetic attractive force is less likely to occur as compared to in the facing region 101.

Thus, in the third embodiment, the slits 13 are provided in the facing region 101 of the rotor core 10, while no slit 13 is provided in the overhang region 102, or the number of slits 13 is made smaller in the overhang region 102 than in the facing region 101. By decreasing the number of slits 13, the weight of the rotor core 10 can be increased, and the inertia of the rotor core 10 can be increased.

The number of slits 13 in the overhang region 102 of the rotor core 10 is made smaller than the number of slits 13 in the facing region 101 in this example. However, it is sufficient that the number of holes in the overhang region 102 of the rotor core 10 is smaller than the number of holes in the facing region 101, and such holes are not limited to the slits 13.

It is not necessary that the number of holes in each of all the steel laminations in the overhang region 102 of the rotor core 10 is smaller than the number of holes in the steel lamination in the facing region 101. It is sufficient that the number of holes in at least one steel lamination in the overhang region 102 is smaller than the number of holes in the steel lamination in the facing region 101.

The motor and the compressor of the third embodiment are configured in the same manner as the motor 100 and the compressor 300 of the first embodiment except for the points described above.

As described above, in the third embodiment, the facing region 101 of the rotor core 10 has the slits 13, while at least a part of the overhang region 102 has no slit 13 or fewer slits 13 than the slits 13 in the facing region 101. Therefore, the inertia can be increased without impairing the performance of the motor 100. That is, the rotation of the rotor 1B can be stabilized, and the motor efficiency can be improved.

The configuration described in the second embodiment may be applied to the third embodiment.

Fourth Embodiment

Figure 11A:
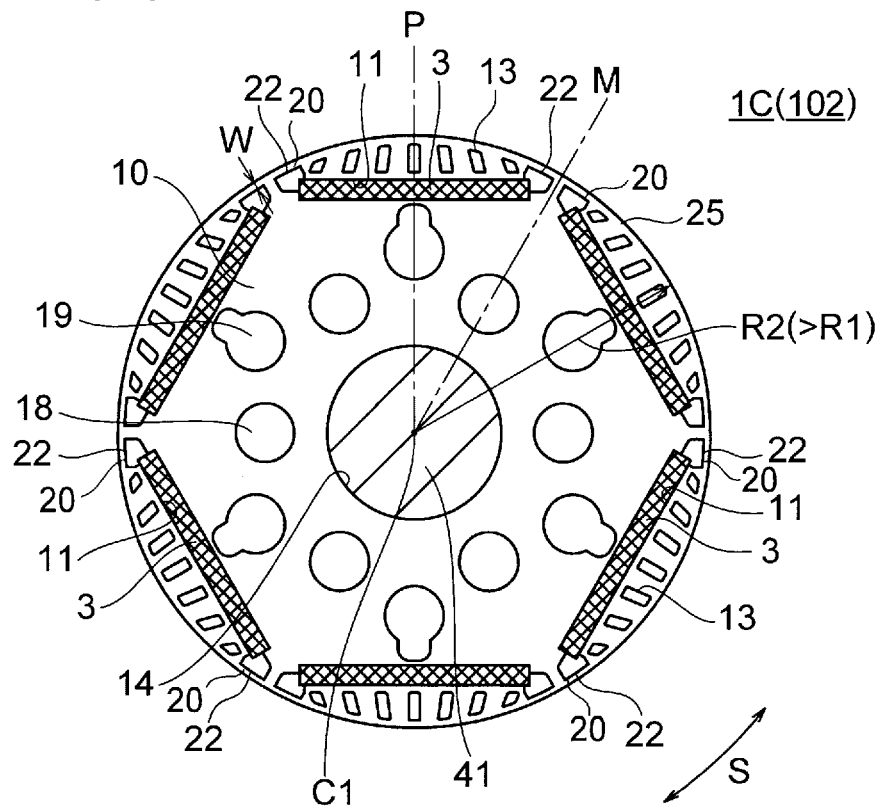
FIG. 11(A) is a cross-sectional view illustrating a cross-sectional shape of an overhang region of a rotor of a fourth embodiment.
Figure 11B:
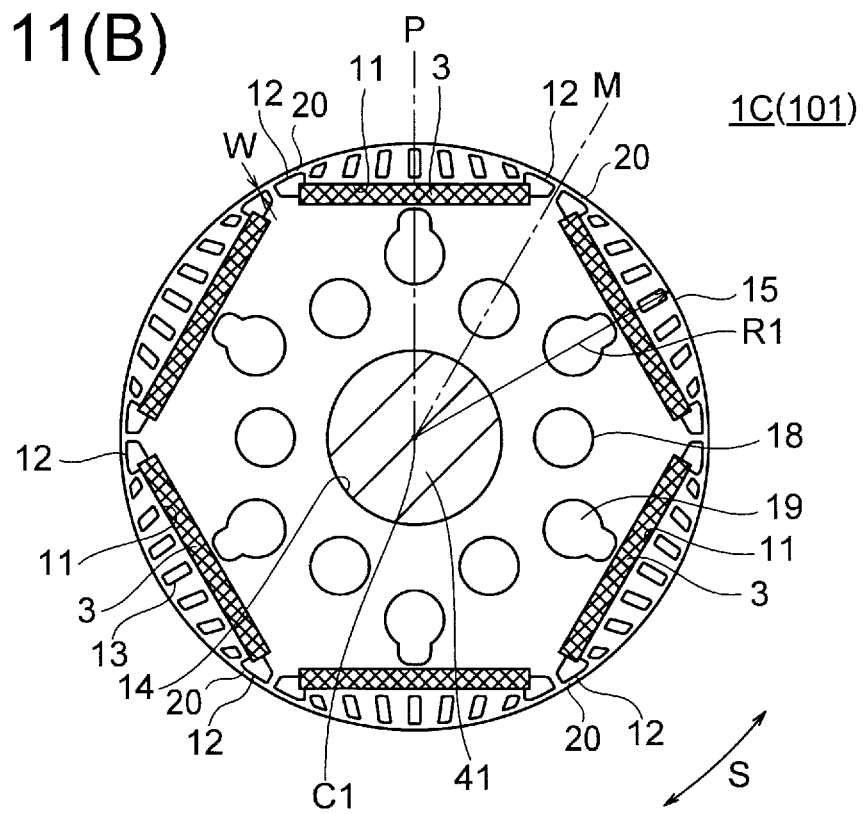
FIG. 11(B) is a cross-sectional view illustrating a cross-sectional shape of a facing region of the rotor of the fourth embodiment.

FIG. 11(A) is a sectional view of the overhang region 102 of a rotor 1C of a motor of a fourth embodiment, and FIG. 11(B) is a sectional view of the facing region 101 of the motor of the fourth embodiment. In the fourth embodiment, the shape of the opening 12 in the rotor 1C differs between the facing region 101 and the overhang region 102.

More specifically, the openings 22 in the overhang region 102 of the rotor core 10 illustrated in FIG. 11(A) are formed to be elongated outward in the radial direction with respect to the openings 12 in the facing region 101 of the rotor core 10 illustrated in FIG. 11(B). In other words, the opening 22 illustrated in FIG. 11(A) is formed to protrude outward in the radial direction with respect to the opening 12 illustrated in FIG. 11(B).

An outer circumference 25 of the overhang region 102 of the rotor core 10 illustrated in FIG. 11(A) is formed to have a circular shape, which is similar to the outer circumference 15 of the facing region 101 of the rotor core 10 illustrated in FIG. 11(B). A distance R2 from the center axis C1 to the outer circumference 25 is longer than the distance R1 from the center axis C1 to the outer circumference 15.

In the fourth embodiment, even when the outer circumference 25 of the overhang region 102 of the rotor core 10 has a circular shape, the minimum width W of the thin wall portion 20 between the opening 22 and the outer circumference 25 in the overhang region 102 can be made equal to the minimum width W of the thin wall portion 20 between the opening 12 and the outer circumference 15 in the facing region 101.

It is not necessary that the openings 22 of all the steel laminations in the overhang region 102 of the rotor core 10 protrude outward in the radial direction. It is sufficient that the openings 22 of at least one steel lamination in the overhang region 102 protrude outward in the radial direction.

The outer circumference of each of the facing region 101 and the overhang region 102 of the rotor core 10 is not limited to a circular shape, but may be, for example, a flower circle shape whose outer diameter is maximum at the pole centers and is minimum at the inter-pole portions.

The motor and the compressor of the fourth embodiment are configured in the same manner as the motor 100 and the compressor 300 of the first embodiment except for the points described above.

As described above, in the fourth embodiment, the opening 22 in at least a part of the overhang region 102 of the rotor core 10 protrudes outward in the radial direction with respect to the opening 12 in the facing region 101 of the rotor core 10, and thus the minimum width W of the thin wall portion 20 can be made the same in the facing region 101 and in the overhang region 102, even when the outer circumferences of the facing region 101 and the overhang region 102 of the rotor core 10 have circular shapes. This makes it possible to stabilize the rotation of the rotor core 10 against the load pulsation of the compression mechanism portion 301 and to suppress the short-circuit magnetic flux between adjacent magnetic poles, as in the first embodiment. That is, the rotation of the rotor 1C can be stabilized, and the motor efficiency can be improved.

The configuration described in the second embodiment or the third embodiment may be applied to the fourth embodiment.

Fifth Embodiment

Figure 12:
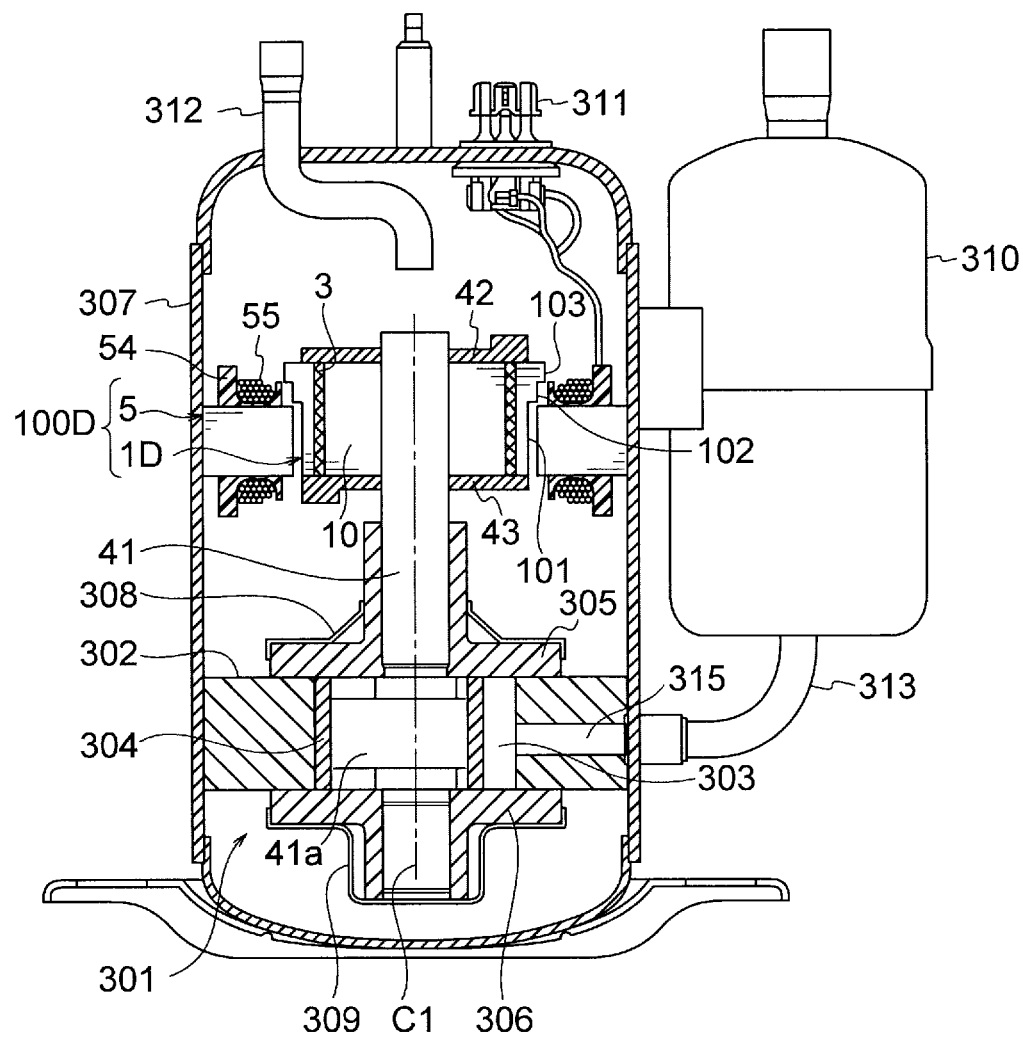
FIG. 12 is a longitudinal sectional view illustrating a compressor of a fifth embodiment.

FIG. 12 is a longitudinal sectional view illustrating a compressor 300D of a fifth embodiment. In the fifth embodiment, the rotor core 10 of a rotor 1D has two-staged overhang regions 102 and 103.

More specifically, as illustrated in FIG. 12, the rotor core 10 has a first overhang region 102 that protrudes from the stator core 50 on the opposite side to the compression mechanism portion 301, and a second overhang region 103 that protrudes from the first overhang region 102.

Figure 13A:
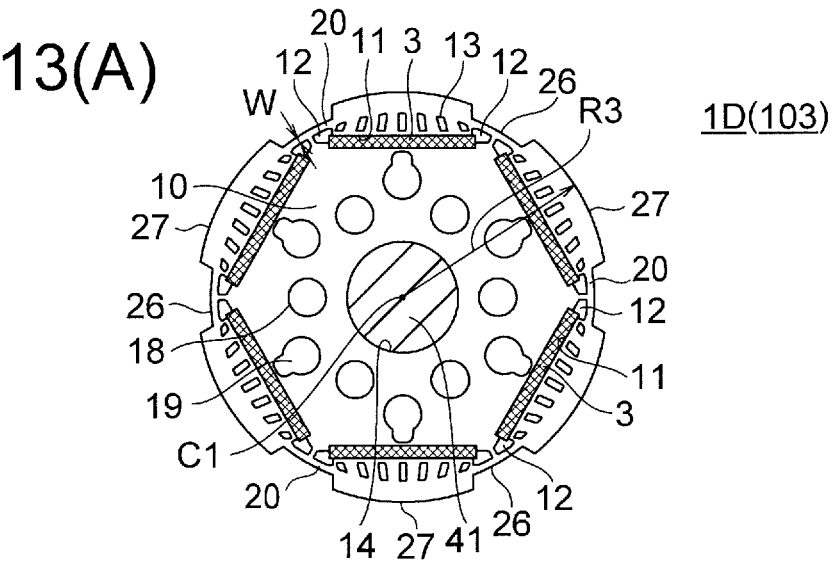
FIG. 13(A) is a cross-sectional view illustrating a cross-sectional shape of a second overhang region of a rotor of the fifth embodiment.
Figure 13B:
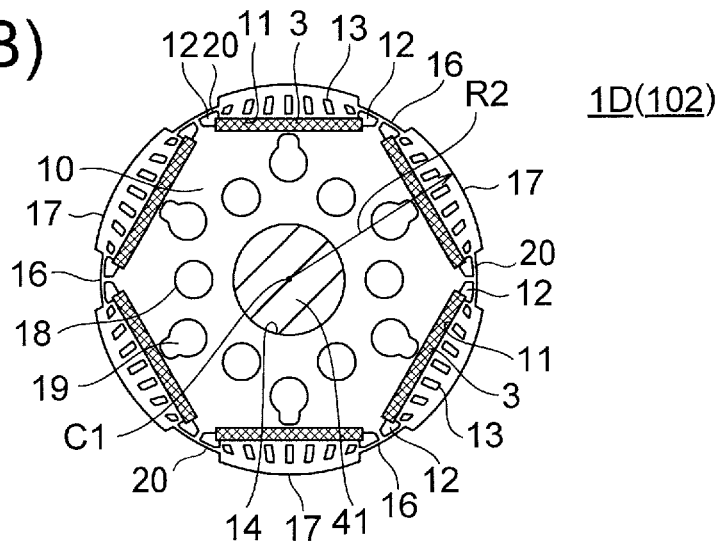
FIG. 13(B) is a cross-sectional view illustrating a cross-sectional shape of a first overhang region of the rotor of the fifth embodiment.
Figure 13C:
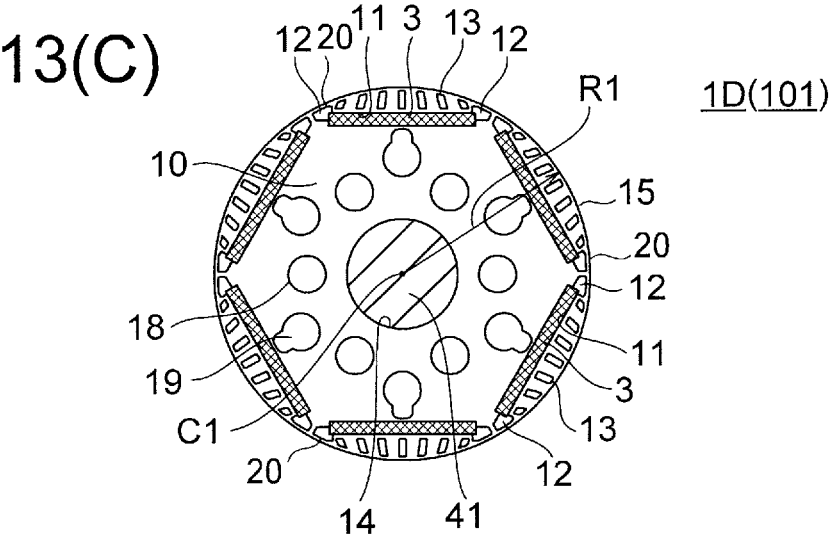
FIG. 13(C) is a cross-sectional view illustrating a cross-sectional shape of a facing region of the rotor of the fifth embodiment.

FIG. 13(A) is a sectional view of the second overhang region 103, FIG. 13(B) is a sectional view of the first overhang region 102, and FIG. 13(C) is a sectional view of the facing region 101, in the rotor 1D of a motor 100D of the fifth embodiment.

As illustrated in FIG. 13(A), an outer circumference portion 27 located on the outer side in the radial direction of each magnet insertion hole 11 in the second overhang region 103 of the rotor core 10 is located on the outer side in the radial direction with respect to the outer circumference portion 17 in the first overhang region 102 illustrated in FIG. 13(B).

The cross-sectional shape of the first overhang region 102 of the rotor core 10 illustrated in FIG. 13(B) is as described in the first embodiment with reference to FIG. 4(A). The cross-sectional shape of the facing region 101 of the rotor core 10 illustrated in FIG. 13(C) is as described in the first embodiment with reference to FIG. 4(B).

That is, a distance R3 (FIG. 13(A)) from the center axis C1 to the outer circumference portion 27 in the second overhang region 103 of the rotor core 10 is longer than the distance R2 (FIG. 13(B)) from the center axis C1 to the outer circumference portion 17 in the first overhang region 102 of the rotor core 10, and longer than the distance R1 (FIG. 13(C)) from the center axis C1 to the outer circumference 15 in the facing region 101 of the rotor core 10.

An outer circumference portion 26 located on the outer side in the radial direction of the thin wall portion 20 in the second overhang region 103 of the rotor core 10 is located at the same position in the radial direction as the outer circumference 15 in the facing region 101 and the outer circumference portion 16 in the first overhang region 102. That is, the minimum width W of the thin wall portion 20 is the same in the facing region 101, in the first overhang region 102, and in the second overhang region 103.

In the fifth embodiment, since the rotor core 10 has two-staged overhang regions 102 and 103, the inertia of the rotor core 10 is further increased. The minimum width W of the thin wall portion 20 of the rotor core 10 is the same in the facing region 101, in the overhang region 102, and in the overhang region 103, and thus the short-circuit magnetic flux between adjacent magnetic poles can be suppressed.

The motor and the compressor of the fifth embodiment are configured in the same manner as the motor 100 and the compressor 300 of the first embodiment except for the points described above.

As described above, in the fifth embodiment, since the rotor core 10 has the two-stage overhang regions 102 and 103, the inertia of the rotor core 10 can be further increased, thereby further stabilizing the rotation of the rotor 1D, and suppressing vibration and noise. The minimum width W of the thin wall portion 20 is the same in the facing region 101, in the overhang region 102, and in the overhang region 103, and thus the short-circuit magnetic flux between adjacent magnetic poles can be suppressed. That is, the rotation of the rotor 1D can be stabilized, and the motor efficiency can be improved.

Although the case where the rotor core 10 has the two-staged overhang regions 102 and 103 has been described, the rotor core may have three or more stages of overhang regions.

The configuration described in the second embodiment, the third embodiment, or the fourth embodiment may be applied to the fifth embodiment.

Sixth Embodiment

Figure 14:
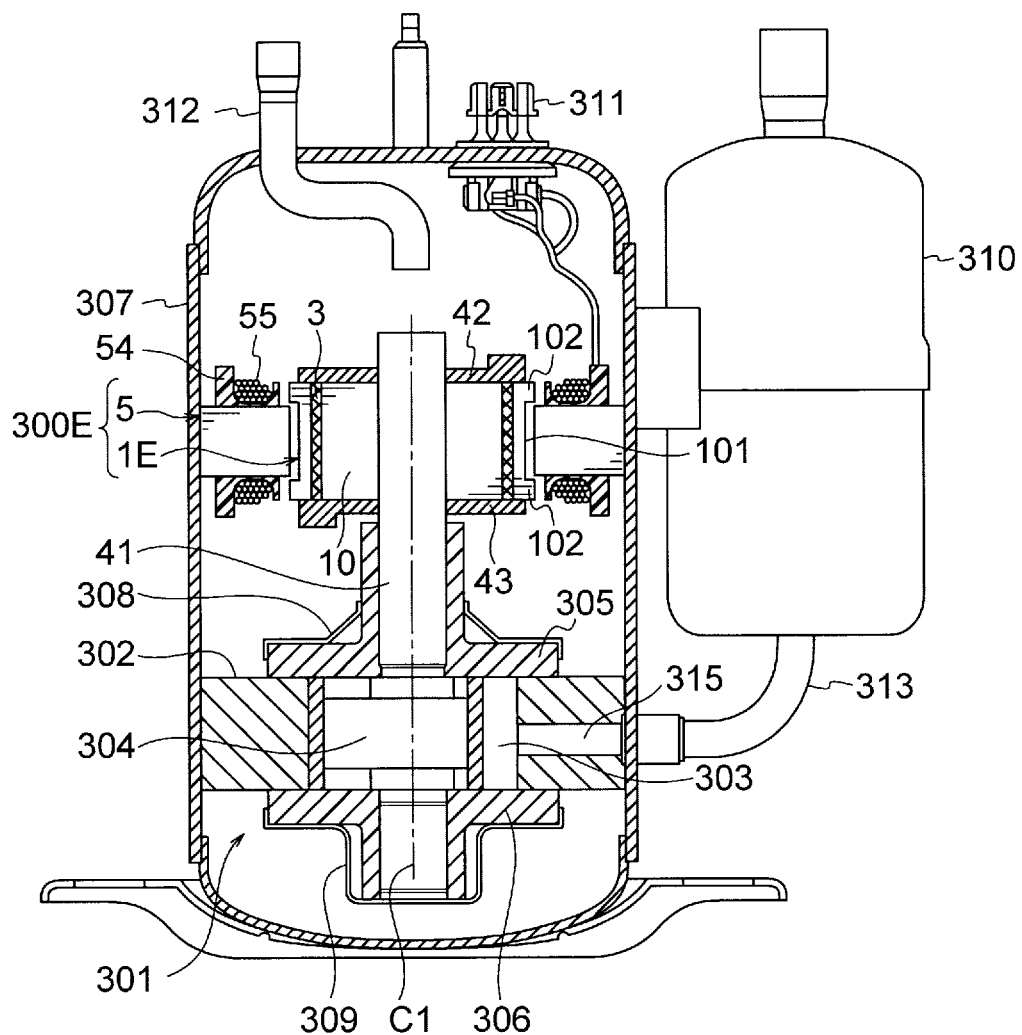
FIG. 14 is a longitudinal sectional view illustrating a compressor of a sixth embodiment.

FIG. 14 is a longitudinal sectional view illustrating a compressor 300E of a sixth embodiment. In the sixth embodiment, the rotor core 10 of a rotor 1E has the overhang region 102 on each of both sides of the facing region 101 in the axial direction.

More specifically, as illustrated in FIG. 14, the rotor core 10 has the overhang region 102 that protrudes from the stator core 50 on the opposite side to the compression mechanism portion 301, and another overhang region 102 that protrudes from the stator core 50 toward the compression mechanism portion 301.

The cross-sectional shape of each overhang region 102 of the rotor core 10 is as described in the first embodiment with reference to FIG. 4(A). The cross-sectional shape of the facing region 101 of the rotor core 10 is as described in the first embodiment with reference to FIG. 4(B).

In the sixth embodiment, since the rotor core 10 has the overhang region 102 on each of both sides in the axial direction, the inertia of the rotor core 10 is further increased. The minimum width W of the thin wall portion 20 in the rotor core 10 is the same in the facing region 101 and in each overhang region 102, and thus the short-circuit magnetic flux between adjacent magnetic poles can be suppressed.

The motor and the compressor of the sixth embodiment are configured in the same manner as the motor 100 and the compressor 300 of the first embodiment except for the points described above.

As described above, in the sixth embodiment, since the rotor core 10 has the overhang region 102 on each of both sides in the axial direction, the inertia of the rotor core 10 can be further increased, thereby further stabilizing the rotation of the rotor 1E, and suppressing vibration and noise. The minimum width W of the thin wall portion 20 of the rotor core 10 is the same in the facing region 101 and in each overhang region 102, and thus the short-circuit magnetic flux between adjacent magnetic poles can be suppressed, and the motor efficiency can be improved.

The above-described configuration in which the overhang region is provided on each of both sides of the rotor core 10 in the axial direction can be applied to each of the second to fifth embodiments.

Control System

Figure 15:
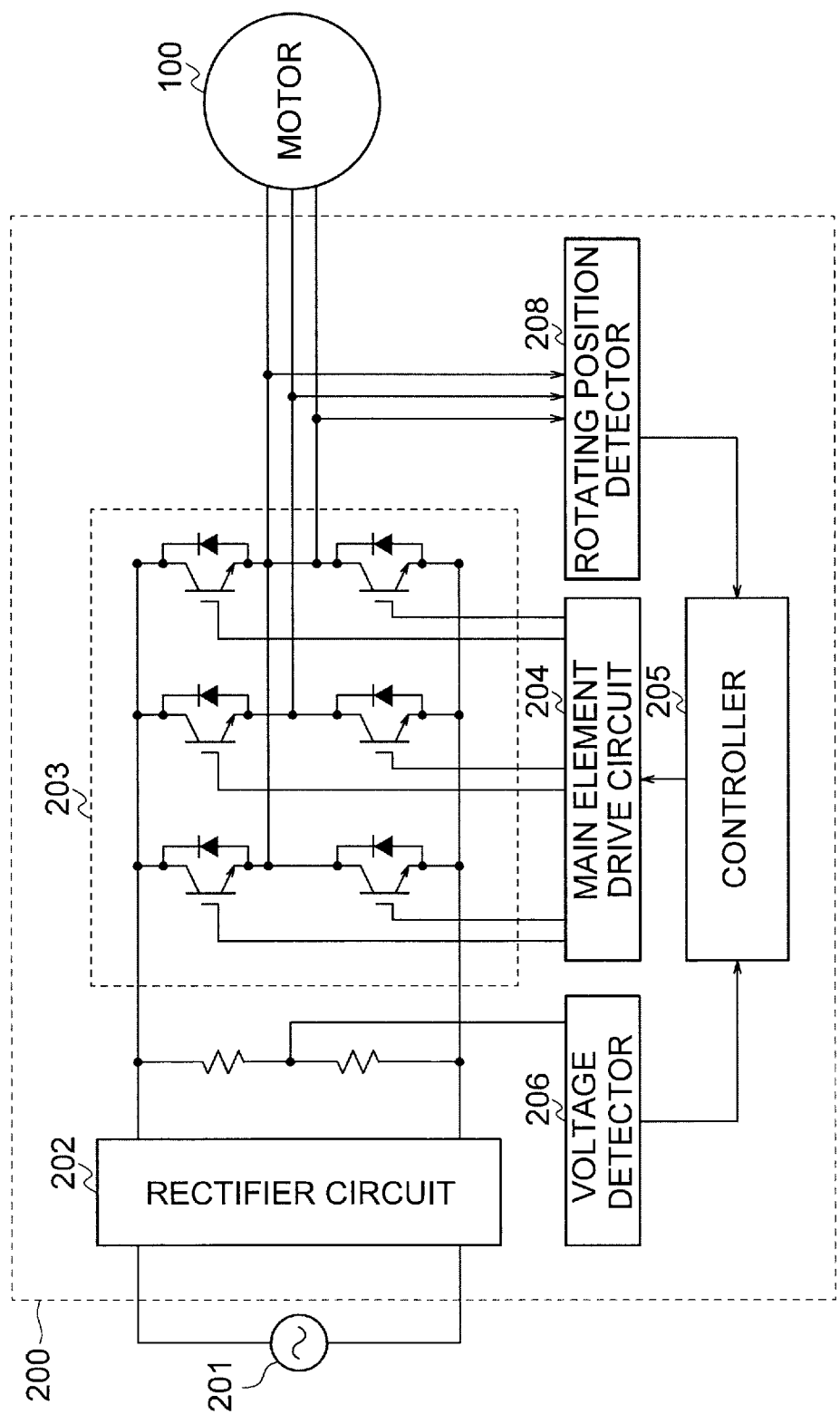
FIG. 15 is a block diagram illustrating a control system for the motor of each embodiment.

Next, a control system for the motor 100 of each of the first to sixth embodiments will be described. FIG. 15 is a block diagram illustrating the control system for the motor 100. A drive circuit 200 that controls the motor 100 includes a rectifier circuit 202 that converts an AC voltage supplied from a commercial AC power supply 201 into a DC voltage, an inverter 203 that converts the DC voltage output from the rectifier circuit 202 into an AC voltage and supplies the AC voltage to the motor 100, and a main element drive circuit 204 that drives the inverter 203.

The drive circuit 200 also includes a voltage detector 206 that detects the DC voltage output from the rectifier circuit 202, a rotating position detector 208 that detects a terminal voltage of the motor 100 to thereby detect a position of the rotor of the motor 100, and a controller 205 that calculates an optimum output voltage of the inverter 203 and outputs a pulse width modulation (PWM) signal to the main element drive circuit 204 based on the result of calculation.

Two voltage dividing resistors connected in series are provided between the rectifier circuit 202 and the inverter 203. The voltage detector 206 samples and holds an electrical signal obtained by lowering the high DC voltage using a voltage divider circuit formed of these voltage dividing resistors.

The AC power supplied from the inverter 203 is supplied to the coils 55 of the motor 100 through the terminals 311 of the compressor 300 (FIG. 12), so that the rotor 1 rotates by the rotating magnetic field.

The rotating position detector 208 detects the rotating position of the rotor 1 and outputs the position information to the controller 205. The controller 205 calculates an optimum output voltage of the inverter 203 to be supplied to the motor 100, based on the position information of the rotor 1 and based on a target rotation speed command or information on operating conditions of the apparatus, sent from outside the drive circuit 200. Then, the controller 205 outputs the calculated output voltage to the main element drive circuit 204. Switches of the inverter 203 are switched by the main element drive circuit 204.

Variable speed drive of the motor 100 is performed under PWM control by the inverter 203 of the drive circuit 200. Instead of the motor 100 of the first embodiment, the motors of the second to sixth embodiments may be used.

When control is performed using the inverter 203, the control against load pulsation is generally difficult. However, using the motor of each of the above described embodiments makes it possible to stably drive the motor against the load pulsation of the compression mechanism portion 301.

Air Conditioner

Next, an air conditioner 400 (also referred to as a refrigeration air conditioning apparatus) to which the compressor 300 of each embodiment is applicable will be described. FIG. 16 is a diagram illustrating a configuration of the air conditioner 400. The air conditioner 400 includes the compressor 300 of the first embodiment, a four-way valve 401 as a switching valve, a condenser 402 to condense refrigerant, a decompressor 403 to reduce the pressure of the refrigerant, an evaporator 404 to evaporate the refrigerant, and a refrigerant pipe 410 to connect these components.

The compressor 300, the condenser 402, the decompressor 403, and the evaporator 404 are connected together by the refrigerant pipe 410 to constitute a refrigerant circuit. The compressor 300 includes an outdoor fan 405 facing the condenser 402 and an indoor fan 406 facing the evaporator 404.

The operation of the air conditioner 400 is as follows. The compressor 300 compresses sucked refrigerant and sends out the compressed refrigerant as high-temperature and high-pressure refrigerant gas. The four-way valve 401 is provided for switching a flow direction of the refrigerant. During a cooling operation, the four-way valve 401 causes the refrigerant sent from the compressor 300 to flow into the condenser 402 as illustrated in FIG. 16.

The condenser 402 exchanges heat between the refrigerant sent from the compressor 300 and the outdoor air sent by the outdoor fan 405 to condense the refrigerant and sends out the condensed refrigerant as liquid refrigerant. The decompressor 403 expands the liquid refrigerant sent from the condenser 402 and then sends out the expanded refrigerant as low-temperature and low-pressure liquid refrigerant.

The evaporator 404 exchanges heat between the low-temperature and low-pressure liquid refrigerant sent from the decompressor 403 and indoor air to evaporate (vaporize) the refrigerant, and sends out the evaporated refrigerant as refrigerant gas. Thus, air deprived of heat in the evaporator 404 is supplied by the indoor fan 406 to the interior of a room, which is a space to be air-conditioned.

During a heating operation, the four-way valve 401 causes the refrigerant sent from the compressor 300 to flow into the evaporator 404. In this case, the evaporator 404 functions as a condenser, and the condenser 402 functions as an evaporator.

The compressor 300 of the air conditioner 400 suppresses vibration and noise and has high operating efficiency, as described in the first embodiment. Thus, quietness of the air conditioner 400 can be improved, and an operation efficiency of the air conditioner 400 can be improved.

Instead of the compressor of the first embodiment, the compressor of each of the second to sixth embodiments may be used. Any components of the air conditioner 400 other than the compressor 300 are not limited to the configuration examples described above.

Although the desirable embodiments of the present invention have been specifically described above, the present invention is not limited to the above-described embodiments, and various modifications or changes can be made to those embodiments without departing from the scope of the present invention.

What is claimed is:

1. A motor provided in a compressor, the motor comprising:
a shaft connected to a compression mechanism portion of the compressor;
a rotor core having a shaft hole to which the shaft is fixed, an outer circumference extending in a circumferential direction about a center axis of the shaft, a magnet insertion hole formed along the outer circumference, and an opening disposed adjacent to the magnet insertion hole in the circumferential direction, the rotor core having a thin wall portion between the opening and the outer circumference;
a permanent magnet inserted in the magnet insertion hole;
a stator core provided so as to surround the rotor core from an outer side in a radial direction about the center axis, the stator core having a length in a direction of the center axis shorter than that of the rotor core; and
a coil wound on the stator core,
wherein the rotor core has a facing region where the rotor core faces the stator core in the radial direction and an overhang region where the rotor core protrudes from the stator core in the direction of the center axis,
wherein a distance from the center axis to a portion of the outer circumference of the rotor core located on an outer side of the magnet insertion hole in the radial direction is longer in at least part of the overhang region than in the facing region, and
wherein a minimum width of the thin wall portion in the radial direction is the same in the facing region and in the overhang region.

2. The motor according to claim 1, wherein the outer circumference in the at least part of the overhang region has a shape in which the portion of the outer circumference located on the outer side of the magnet insertion hole in the radial direction protrudes outward in the radial direction with respect to a portion of the outer circumference located on the outer side of the opening in the radial direction.

3. The motor according to claim 1, wherein the opening in the at least part of the overhang region protrudes outward in the radial direction with respect to the opening in the facing region.

4. The motor according to claim 1, wherein the overhang region is located on an opposite side to the compression mechanism portion in the direction of the center axis.

5. The motor according to claim 1, wherein an inertia per unit length of the rotor core in the direction of the center axis is greater in the at least part of the overhang region than in the facing region.

6. The motor according to claim 1, wherein a weight per unit length of the rotor core in the direction of the center axis is greater in the at least part of the overhang region than in the facing region.

7. The motor according to claim 1, wherein the rotor core has a plurality of steel laminations that are stacked in the direction of the center axis, and
wherein a sheet thickness of the steel lamination in the at least part of the overhang region is thicker than a sheet thickness of the steel lamination in the facing region.

8. The motor according to claim 1, wherein the rotor core has a first number of holes between the shaft hole and the outer circumference of the rotor core in the facing region, and
wherein the rotor core has a second number of holes between the shaft hole and the outer circumference of the rotor core in the at least part of the overhang region, the second number being smaller than the first number.

9. The motor according to claim 8, wherein the first number of holes include at least one slit formed between the magnet insertion hole and the outer circumference.

10. The motor according to claim 1, wherein the overhang region is provided on each of both sides of the stator core in the direction of the center axis.

11. The motor according to claim 1, wherein the overhang region is a first overhang region,
wherein the rotor core has a second overhang region that protrudes from the stator core more than the first overhang region in the direction of the center axis,
wherein a distance from the center axis to the portion of the outer circumference of the rotor core located on the outer side of the magnet insertion hole in the radial direction is longer in at least part of the second overhang region than in the first overhang region, and is also longer in the first overhang region than in the facing region, and
wherein a minimum width of the thin wall portion in the radial direction is the same in the facing region, in the first overhang region and in the second overhang region.

12. The motor according to claim 1, wherein the motor is controlled by an inverter.

13. A compressor comprising:
the motor according to claim 1; and
the compression mechanism portion driven by the motor.

14. An air conditioner comprising:
the compressor according to claim 13;
a condenser to condense a refrigerant sent from the compressor;
a decompressor to decompress the refrigerant condensed by the condenser; and
an evaporator to evaporate the refrigerant decompressed by the decompressor.

* * * * *